United States Patent
Wills et al.

(10) Patent No.: US 7,067,319 B2
(45) Date of Patent: Jun. 27, 2006

(54) SYSTEM FOR DIAGNOSING REAGENT SOLUTION QUALITY AND EMISSIONS CATALYST DEGRADATION

(75) Inventors: J. Stephen Wills, Columbus, IN (US); Eric B. Andrews, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 73 days.

(21) Appl. No.: 10/876,066

(22) Filed: Jun. 24, 2004

(65) Prior Publication Data

US 2005/0287034 A1   Dec. 29, 2005

(51) Int. Cl.
*G01N 31/10* (2006.01)
*F01N 3/18* (2006.01)
*F01N 3/20* (2006.01)

(52) U.S. Cl. .................. 436/37; 60/274; 60/276; 60/277; 60/285; 60/286; 60/295; 60/299; 422/111; 422/172; 423/239.1; 436/37; 436/55; 436/111; 436/113; 436/116; 436/118; 436/183; 701/103; 701/108

(58) Field of Classification Search .............. 60/274, 60/276–277, 285–286, 295, 299; 422/62, 422/111, 172; 423/235, 239.1; 436/37, 43, 436/50, 55–56, 111, 113, 116, 118, 159, 181, 436/183; 701/103, 108

See application file for complete search history.

(56) References Cited

U.S. PATENT DOCUMENTS

| | | | |
|---|---|---|---|
| 4,403,473 A | | 9/1983 | Gladden |
| 4,751,054 A | * | 6/1988 | Watanabe ............... 422/111 |
| 4,963,332 A | * | 10/1990 | Brand et al. ............. 423/235 |
| 5,367,875 A | | 11/1994 | Aboujaoude et al. |
| 5,522,218 A | | 6/1996 | Lane et al. |
| 5,643,536 A | | 7/1997 | Schmelz |
| 5,753,805 A | | 5/1998 | Maloney |
| 5,941,067 A | | 8/1999 | Hirota et al. |
| 6,082,102 A | | 7/2000 | Wissler et al. |
| 6,092,367 A | | 7/2000 | Dolling |
| 6,119,448 A | | 9/2000 | Emmerling et al. |
| 6,125,629 A | | 10/2000 | Patchett |
| 6,209,313 B1 | | 4/2001 | Wissler et al. |
| 6,209,315 B1 | | 4/2001 | Weigl |

(Continued)

FOREIGN PATENT DOCUMENTS

EP    1164266    * 12/2001

(Continued)

*Primary Examiner*—Arlen Soderquist
(74) *Attorney, Agent, or Firm*—Barnes & Thornburg LLP

(57) ABSTRACT

A system for determining a reagent solution quality indicator includes a reagent solution source for supplying the reagent solution to an emissions catalyst configured to receive a NOx-containing gas therethrough, means for determining a flow rate of NOx reduced from the gas by the catalyst, means for determining a flow rate of the reagent solution into the catalyst, and a control circuit determining the reagent solution quality indicator as a function of the NOx flow rate and the reagent solution flow rate. The system may additionally be configured to diagnose reagent solution quality by configuring the control circuit to monitor the reagent solution quality indicator over time and produce a fault value if the reagent solution quality indicator crosses a reagent quality indicator threshold, and to diagnose the catalyst by producing another fault value if the catalyst capacity point falls outside of a catalyst capacity point threshold.

69 Claims, 14 Drawing Sheets

U.S. PATENT DOCUMENTS

| | | |
|---|---|---|
| 6,253,543 B1 | 7/2001 | Russell |
| 6,327,851 B1 | 12/2001 | Bouchez et al. |
| 6,343,468 B1 | 2/2002 | Doelling et al. |
| 6,401,450 B1 | 6/2002 | Hoshi |
| 6,408,619 B1 | 6/2002 | Wissler et al. |
| 6,415,602 B1 | 7/2002 | Patchett et al. |
| 6,422,005 B1 | 7/2002 | Dolling et al. |
| 6,470,673 B1 | 10/2002 | van Nieuwstadt et al. |
| 6,532,736 B1 | 3/2003 | Hammerle et al. |
| 6,546,720 B1 | 4/2003 | van Nieuwstadt |
| 6,601,387 B1 | 8/2003 | Zurawski et al. |
| 6,658,364 B1 | 12/2003 | Olin |
| 6,697,729 B1 | 2/2004 | Wright |
| 6,732,522 B1 | 5/2004 | Wright et al. |
| 2003/0036841 A1 | 2/2003 | Xu et al. |
| 2003/0070420 A1 | 4/2003 | Uchida |
| 2004/0040289 A1* | 3/2004 | Mazur et al. .................. 60/295 |
| 2004/0098980 A1* | 5/2004 | Montreuil et al. ............. 60/295 |

FOREIGN PATENT DOCUMENTS

| | | | |
|---|---|---|---|
| GB | 2375059 | * | 11/2002 |
| JP | 3-175112 | * | 7/1991 |

* cited by examiner

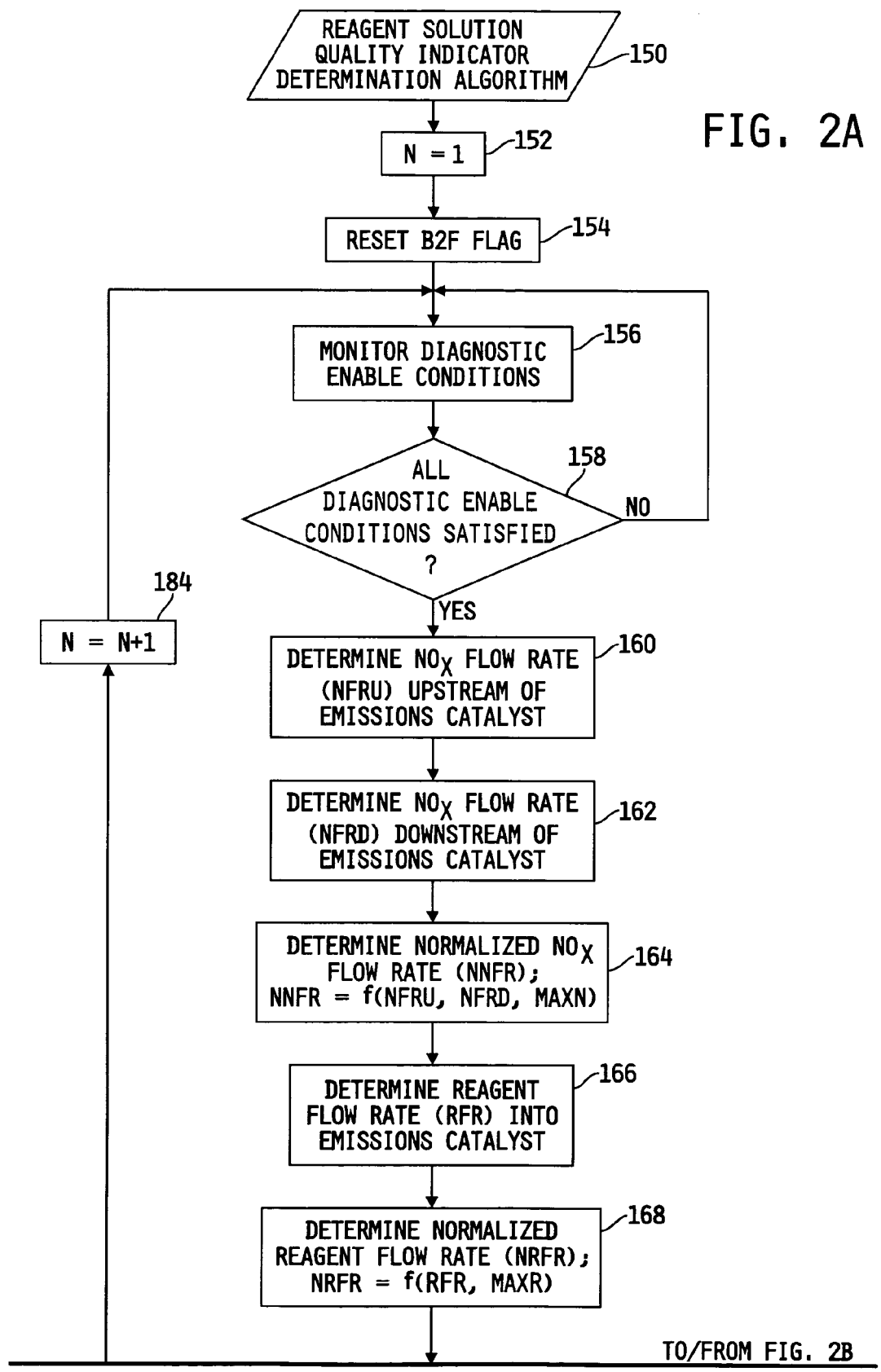

US 7,067,319 B2

SYSTEM FOR DIAGNOSING REAGENT SOLUTION QUALITY AND EMISSIONS CATALYST DEGRADATION

FIELD OF THE INVENTION

The present invention relates generally to systems for diagnosing reagent solution quality and emissions catalyst degradation, and more specifically to such systems for diagnosing reagent solution quality and emissions catalyst degradation as functions of NOx and reagent solution flow rates.

BACKGROUND OF THE INVENTION

Systems for treating exhaust gas produced by an internal combustion engine to reduce exhaust gas emissions in the form of particulates and/or NOx are generally known. Such exhaust gas "aftertreatment" systems may include a selective catalytic reduction system for the purpose of reducing the NOx level of the exhaust gas below a specified maximum NOx level.

A selective catalytic reduction system, or SCR, typically includes a catalytic reducing agent, or reagent, in the form of a reagent solution that is controllably dispensed into the exhaust gas stream produced by the engine before entering a conventional SCR catalyst. The SCR catalyst reacts with the combination of engine exhaust gas and reagent solution in a known manner to reduce the NOx content of the exhaust gas stream.

Prior to dispensing the reagent solution into the exhaust gas stream, there may be opportunities for the solution to become under-concentrated, over-concentrated and/or exposed to contaminants as a result of manufacturing concentration variability, tampering, accidental introduction of improper fluid, mechanical failures or undesirable mechanical operating conditions, and/or environmental degradation. It is therefore desirable to monitor the quality, e.g., concentration and/or contamination level, of the reagent solution under a wide variety of operating conditions, and to note occasions when the reagent solution quality is not within specified reagent quality limits, and to further modify conventional dosing of the reagent solution into the exhaust gas stream when the temperature of the reagent solution is at, or near, freezing temperatures.

SUMMARY OF THE INVENTION

The present invention may comprise one or more of the following features and combinations thereof. A system and method for determining reagent solution quality may comprise a reagent solution source for supplying the reagent solution to an emissions catalyst configured to receive a NOx-containing gas therethrough, means for determining a NOx flow rate corresponding to a flow rate of NOx reduced from the gas by the emissions catalyst, means for determining a reagent solution flow rate corresponding to a flow rate of the reagent solution into the emissions catalyst, and a control circuit may be configured to determine the reagent solution quality indicator as a function of the NOx flow rate and the reagent solution flow rate.

A system and method for diagnosing reagent solution quality may comprise a reagent solution source for supplying the reagent solution to an emissions catalyst configured to receive a NOx-containing gas therethrough, means for determining a reagent solution quality indicator as a function of a flow rate of NOx reduced from the gas by the emissions catalyst and a flow rate of the reagent solution into the emissions catalyst, and a control circuit monitoring the reagent solution quality indicator over time and producing a fault value if the reagent solution quality indicator crosses a reagent quality indicator threshold.

A system for diagnosing an emissions catalyst configured to receive a Nox-containing gas therethrough may comprise a reagent solution source for supplying the reagent solution to the emissions catalyst, means for determining a NOx flow rate corresponding to a flow rate of NOx reduced from the gas by the emissions catalyst, means for determining a reagent solution flow rate corresponding to a flow rate of the reagent solution into the emissions catalyst, and a control circuit. The control circuit is configured to determine a catalyst capacity point, beyond which a reaction capacity of the emissions catalyst is exceeded, as a function of the NOx flow rate and the reagent solution flow rate, and to produce a fault value if the catalyst capacity point falls beyond a predefined catalyst capacity threshold.

These and other features of the present invention will become more apparent from the following description of the illustrative embodiments.

BRIEF DESCRIPTION OF THE DRAWINGS

FIGS. 2A and 2B show a flowchart of one illustrative embodiment of a software algorithm for determining a reagent solution quality indicator using the system of FIG. 1.

DESCRIPTION OF THE ILLUSTRATIVE EMBODIMENTS

Figure 1:
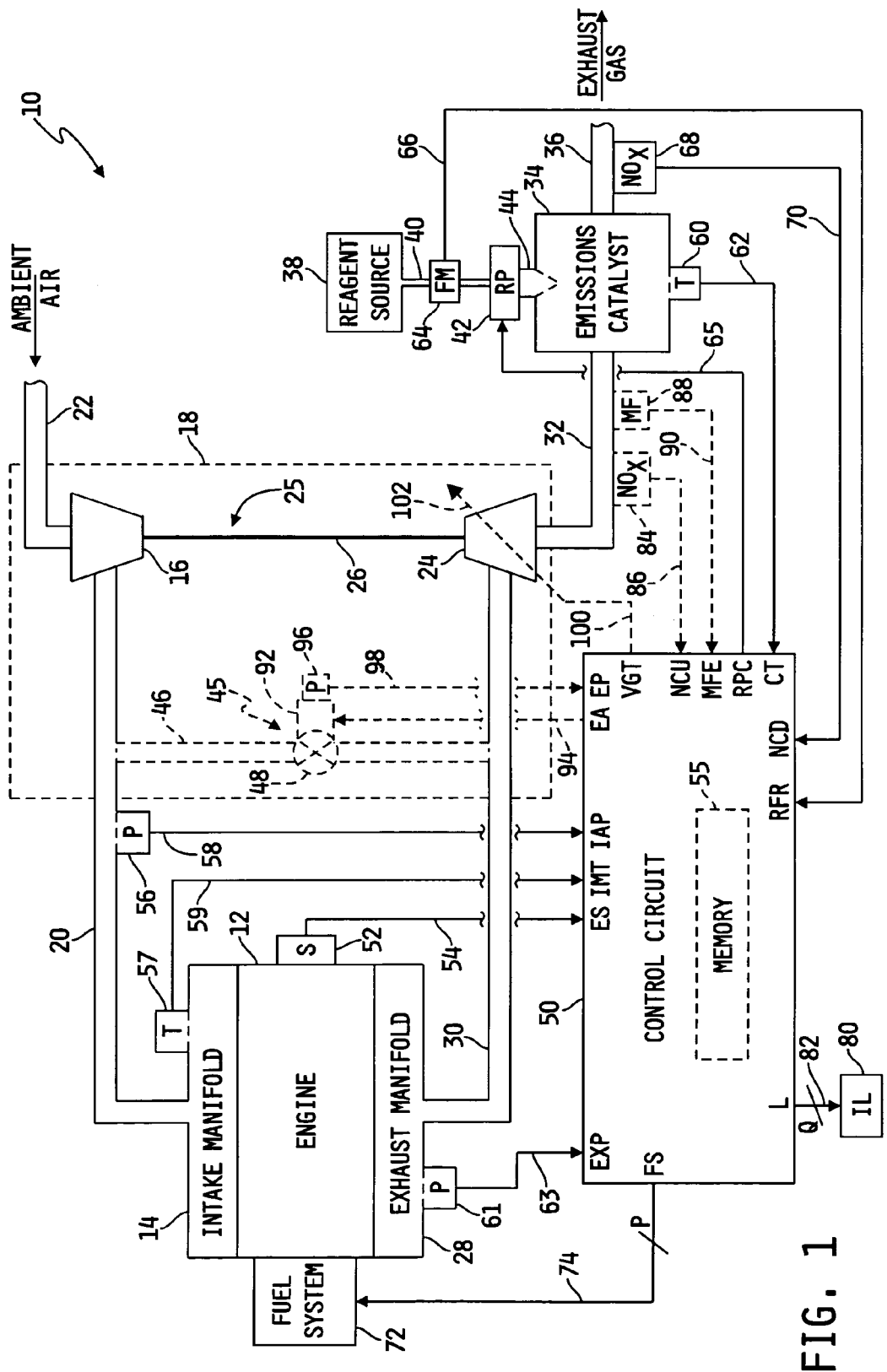
FIG. 1 is a block diagram of one illustrative embodiment of a system for diagnosing reagent solution quality and tracking catalyst degradation.

For the purposes of promoting an understanding of the principles of the invention, reference will now be made to a number of illustrative embodiments illustrated in the drawings and specific language will be used to describe the same.

Referring to FIG. 1, a block diagram of one illustrative embodiment of a system 10 for diagnosing reagent solution quality and emissions catalyst degradation is shown. The system 10 includes an internal combustion engine 12 having an intake manifold 14 fluidly coupled to an intake pipe or conduit 20 for receiving fresh air. An exhaust manifold 28 of the engine 12 is fluidly coupled to an exhaust pipe or conduit 30, and NOx-containing exhaust gas resulting from the combustion process within the engine 12 is directed away from the exhaust manifold 28 via the exhaust pipe or conduit 30. The system 10 may or may not include an air handling system 18, as shown in phantom in FIG. 1. It will be noted that although the internal combustion engine 14 is shown and described herein in the context of a diesel engine, the term "internal combustion engine" should not be so limited. Rather, for purposes of the following description and claims appended hereto, the term "internal combustion engine" may include, but should not be limited to, any of an Otto-cycle engine, a diesel engine, a rotary engine and a gas turbine engine.

The air handling system 18, in embodiments of the system 10 that include an air handling system 18, may include a turbocharger 25 having a compressor 16 defining a compressor inlet fluidly coupled to an air intake pipe or conduit 22, and a compressor outlet fluidly coupled to the intake manifold 14 via the intake pipe or conduit 20. The turbocharger 25 further includes a turbine 24 rotatably coupled to the compressor 16 via drive shaft 26 and defining a turbine inlet fluidly coupled to the exhaust manifold 28 via the exhaust pipe or conduit 30, and a turbine outlet fluidly coupled one end of an exhaust pipe or conduit 32. The turbocharger 25 is responsive, in a known manner, to the flow of exhaust gas through the exhaust conduit 30 to correspondingly modulate the flow of fresh air into the intake conduit 20. In embodiments of the air handling system 18 that do not include a turbocharger 25, the end of the exhaust conduit 30 shown in FIG. 1 as being fluidly coupled to the inlet of the turbine 24 is instead fluidly coupled directly to the end of the exhaust conduit 32 shown in FIG. 1 as being fluidly coupled to the outlet of the turbine 24.

Alternatively or additionally, the air handling system 18 may include an exhaust gas recirculation (EGR) system 45 having an EGR conduit 46 fluidly coupled at one end to the exhaust pipe or conduit 30 and at its opposite end to the intake pipe or conduit 46. An EGR valve 48 or other flow restriction mechanism is disposed in-line with the EGR conduit 46, and in the illustrated embodiment the EGR valve 48 is selectively positionable to allow for the control of recirculated exhaust gas flow through the EGR conduit 46 in a known manner and as will be described in greater detail hereinafter.

The end of the exhaust pipe or conduit 32 opposite that shown in FIG. 1 as being fluidly coupled to the outlet of the turbine 24 is fluidly coupled to an inlet of an emissions catalyst 24 having an outlet fluidly coupled to one end of yet another exhaust pipe or conduit 36 having an opposite end open to ambient. In some embodiments, as described hereinabove, the exhaust pipe or conduit 30 is fluidly coupled directly to the exhaust pipe or conduit 32, and in such embodiments the exhaust gas produced by the engine 12 is directed to the inlet of the emissions catalyst 34 via pipes 30 and 32. In other embodiments, the exhaust pipe or conduit 30 is fluidly coupled to the exhaust gas inlet of the turbocharger turbine 24, and the outlet of the turbine 24 is fluidly coupled to the exhaust pipe or conduit 32. In such embodiments the exhaust gas produced by the engine 12 is directed through the turbocharger turbine 24 to the inlet of the emissions catalyst 24 via the exhaust pipe or conduit 30, and then to the inlet of the emissions catalyst 34 via the exhaust pipe or conduit 32. In either case, exhaust gas exiting the outlet of the emissions catalyst 34 is expelled to ambient via the exhaust pipe or conduit 36.

In the illustrated embodiment, the emissions catalyst 34 includes a conventional SCR catalyst (not shown) configured to reduce the NOx content of the exhaust gas in a known manner. Those skilled in the art will recognize that the emissions catalyst 34 may include more or fewer components, although for purposes of this disclosure the emissions catalyst 34 includes at least an SCR catalyst.

The system 10 further includes a conventional reagent source 38 configured to hold a conventional aqueous reagent solution; e.g., aqueous urea solution or the like. The reagent source 38 defines a reagent solution outlet fluidly coupled to one end of a reagent solution outlet conduit 40 having an opposite end fluidly coupled to an inlet of a conventional reagent solution pump 42. The reagent solution pump 42 may be a conventional pneumatic pump fluidly coupled to a conventional air compressor (not shown) driven by the engine 12, although it will be understood that the reagent solution pump 42 may alternatively be or include other conventional liquid supply pumps. In any case, a liquid outlet of the reagent solution pump 42 is fluidly coupled via conduit to an inlet of a reagent solution injector or spray nozzle 44 having an opposite solution dispensing end fluidly coupled to the emissions catalyst 34. The reagent solution pump 42 may be controlled in a known manner to selectively spray or otherwise dispense via the injector or spray nozzle 44 the reagent solution from the reagent source 38 into the exhaust gas stream flowing through the emission catalyst 34. In one embodiment, the reagent solution is sprayed directly into the SCR catalyst (not shown) contained within the emissions catalyst 34 such that the reagent solution mixes with the exhaust gas flowing through the SCR catalyst, or alternatively into the emissions catalyst 34 just upstream of the SCR catalyst contained therein so that a combination of the exhaust gas exiting the exhaust conduit 32 and the reagent solution dispensed by the reagent pump 42 enters the SCR catalyst. In an alternative embodiment, the spray nozzle may be located sufficiently upstream of the SCR catalyst, e.g., in fluid communication with either the exhaust conduit 32 or the emissions catalyst 34 upstream of the SCR catalyst contained therein, so that the reagent solution that is dispensed by the spray nozzle 44 evaporates and coverts to ammonia before entering the SCR catalyst. In any case, the SCR catalyst is operable, as is known in the art, to react with the combination in a manner that reduces the level or amount of NOx in the exhaust gas entering the SCR catalyst to maintain the NOx level or amount in the exhaust gas exiting the SCR catalyst at or below a target NOx level or amount.

The system 10 further includes a control circuit 50 configured to manage and control the overall operation of the engine 12 and reagent pump 42. Illustratively, the control circuit 50 is a microprocessor-based control computer, and includes a memory 55 having one or more software algorithms stored therein for execution by the control circuit 50 to control operation of the engine 12 and reagent pump 42. Such a control circuit 50 may sometimes be referred to as an "engine control module" or "ECM", an "engine control unit", or "ECU" or the like. It will be understood that the control circuit 50 may alternatively be or include a general purpose control computer or control circuit configured for operation as described hereinafter. In an alternative embodiment, the control circuit 50 may be configured to manage and control the overall operation of the engine 12, and a separate aftertreatment control circuit or computer (not shown) may be provided to control and manage the overall operation of the reagent pump 42 and reagent source 38. In such an embodiment, the control circuit 50 and aftertreatment control circuit will be linked in a known manner for data communications therebetween in accordance with a conventional or proprietary communications protocol so that information available to the engine control circuit 50 can be shared with the aftertreatment control circuit and vice versa.

The control circuit 50 includes a number of inputs for receiving sensory data relating to the operation of the system 10, as well as a number of outputs for controlling one or more subsystems and/or actuators of the system 10. For example, the system 10 includes an engine speed sensor 52 that is electrically connected to an engine speed input, ES, of the control circuit 50 via a signal path 54. The engine speed sensor 52 may illustratively be a Hall effect sensor configured to sense passage thereby of a number of teeth formed on a gear or tone wheel rotating synchronously with the engine crankshaft (not shown). Alternatively, the engine speed sensor 52 may be a variable reluctance or other known speed sensor, and is in any case operable to produce a speed signal on signal path 54 that is indicative of engine rotational speed.

The system 10 further includes a pressure sensor 56 that is disposed in fluid communication with the intake conduit 20 and is electrically connected to an intake air pressure input, IAP, of the control circuit 50 via a signal path 58. Alternatively the pressure sensor 56 may be disposed in fluid communication with the intake manifold 14 as shown in phantom in FIG. 1. In either case, the pressure sensor 56 may be of known construction and is generally operable to produce a pressure signal on signal path 58 that is indicative of the pressure of ambient intake air within the intake conduit 20 and intake manifold 14. In embodiments of the system 10 that include a turbocharger 25, the pressure sensor 56 may sometimes be referred to as a "boost" pressure sensor because it is operable to sense changes in pressure (i.e., "boost" pressure) resulting from the operation of the turbocharger 25.

The system 10 further includes a temperature sensor 57 in fluid communication with the intake manifold 14 and electrically connected to an intake manifold temperature input, IMT, of the control circuit 50 via a signal path 59. The temperature sensor 57 may be of known construction, and is operable to produce a temperature signal on signal path 59 that is indicative of the operating temperature of the intake manifold 14.

The system 10 further includes a temperature sensor 60 in fluid communication with, or attached to a housing of, the emissions catalyst 34, and is electrically connected to a catalyst temperature input, CT, of the control circuit 50 via a signal path 62. The temperature sensor 60 may be of known construction, and is operable to produce a temperature signal on signal path 62 that is indicative of the operating temperature of the emissions catalyst 34. Alternatively, the control circuit 50 may include one or more known software algorithms for determining the emissions catalyst temperature, CT, as function of other operating parameters.

The system 10 further includes a pressure sensor 61 in fluid communication with the exhaust manifold 28, or alternatively with the exhaust conduit 30, and is electrically connected to an exhaust pressure input, EXP, of the control circuit 50 via a signal path 63. The pressure sensor 61 may be of known construction, and is operable to produce a pressure signal on signal path 63 that is indicative of the pressure of exhaust gas produced by the engine 12. Alternatively or additionally, as will be described in greater detail hereinafter, the control circuit 50 may include one or more known software algorithms for estimating EXP as a known function of other engine operating parameters.

The system 10 further includes a flow meter or sensor 64 that is disposed in-line, or in fluid communication with, the reagent solution outlet conduit 40 extending from the reagent source 38, and that is electrically connected to a reagent flow rate, RFR, input of the control circuit 50 via a signal path 66. The flow meter or sensor 64 may be of known construction, and is operable to produce a flow rate signal indicative of the flow rate of reagent solution from the reagent source 38 into the emissions catalyst 34.

The control circuit 50 further includes a reagent pump control output, RPC, electrically coupled to a control input of the reagent pump 42 via a signal path 65. The control circuit 50 is operable to control the operation of the reagent pump 42 in a known manner by selectively activating and deactivating a reagent pump control signal on signal path 65. The reagent pump 42 is, in turn, responsive to active reagent pump control signals to dispense reagent solution from the reagent source 38 to the emissions catalyst 34 via the solution injector or spray nozzle 44.

The system 10 further includes a NOx sensor 68 that is disposed in fluid communication with the exhaust conduit 36 downstream of the emissions catalyst 34, and that is electrically connected to a downstream NOx content input, NCD, of the control circuit 50 via signal path 70. The NOx sensor 68 may be of known construction, and is operable to produce a NOx content signal on signal path 70 that is indicative of the NOx content of the exhaust gas exiting the emissions catalyst 34.

The control circuit 50 further includes a fuel signal output, FS, which is electrically connected to a fuel system 72 of the engine 12 via a number, P, of signal paths 74, wherein P may be any positive integer. The control circuit 50 is operable in a known manner to determine a number of fueling parameters, such as a fuel flow value, FF, (e.g., in mm$^3$/stroke) and a start-of-injection value, SOI, (e.g., a timing value corresponding to a desired time of fuel delivery to the engine cylinders (not shown) or time of activation of a fuel delivery device such as a conventional fuel injector) based on engine operating information including, for example, but not limited to, engine speed, driver requested speed or torque, and the like, and to process these fueling parameters to produce one or more corresponding fueling signals on signal paths 74. The fuel system 72 is, in turn, responsive to the one or more fuel control signals produced by the engine control circuit 50 to correspondingly supply fuel to the engine 12 as is known in the art.

The control circuit 50 further includes a lamp output, L, which is electrically connected to one or more indicator lamps generally indicated at 80 via a number, Q, of signal paths 82, wherein Q may be any positive integer. The control circuit 50 is operable, in some embodiments, to activate one or more of the indicator lamps 80 under certain diagnostic conditions, as will be described in greater detail hereinafter. The one or more indicator lamps may be or include any of a malfunction indicator lamp, a maintenance lamp and a warning lamp, as these lamp terms are generally understood by those skilled in the art.

In some embodiments, the system 10 may include a NOx sensor 84 that may be disposed in fluid communication with the exhaust conduit 32 as illustrated in FIG. 1. Alternatively, such a sensor 84 may be disposed in fluid communication with exhaust conduit 30 or exhaust conduit 36 anywhere their lengths. In any such embodiments, the NOx sensor 84 is electrically connected to an upstream NOx content input, NCU, of the control circuit 50 via signal path 86. In embodiments of the system 10 that include the NOx sensor 84, it may be of known construction and operable to produce a NOx content signal on signal path 86 that is indicative of the NOx content of the exhaust gas entering the emissions catalyst 34. The system 10 may alternatively or additionally include a mass flow sensor 88 that is disposed in fluid communication with the exhaust conduit 32 upstream of the emissions catalyst 34 as shown in phantom in FIG. 1. In such embodiments, the mass flow sensor 88 is electrically connected to a mass flow of exhaust (MFE) input of the control circuit 50 via signal path 90. The mass flow sensor 88 may be of known construction, and is operable to produce a mass flow signal on signal path 90 that is indicative of the mass flow rate of exhaust gas entering the emissions catalyst 34.

In embodiments of the system 10 that include the EGR system 45, the system 45 may further include an EGR valve actuator 92 coupled to the EGR valve 48 and electrically connected to and EGR actuator output, EA, of the control circuit 50 via a signal path 94. The EGR valve actuator 92 is responsive to EGR valve actuator commands produced by the control circuit 50 on signal path 94 to control the position of the EGR valve 48 relative to a reference position. The EGR system 45 may further include an EGR valve actuator position sensor 96 coupled to the EGR valve actuator 92 and electrically connected to an EGR valve position input, EP, of the control circuit 50 via a signal path 98. The position sensor 96 may be of known construction and is operable to produce a position signal on signal path 98 that is indicative of a position of the EGR valve actuator, and thus the position of the EGR valve 48, relative to a reference position.

In embodiments of the system 10 that include a turbocharger 25, the control circuit 50 may include one or more outputs for controlling the swallowing capacity and/or efficiency of the turbocharger turbine 24, wherein the term "turbocharger swallowing capacity" or "swallowing capacity of the turbine" is defined for purposes of this document as the exhaust flow capacity of the turbocharger turbine 24, and the term "turbocharger efficiency" or "efficiency of the turbine" refers to the ability of the turbocharger turbine 24 to process the flow of exhaust gas exiting the exhaust manifold 28. In the embodiment illustrated in FIG. 1, a single air handling output, VGT, of the control circuit 50 is shown electrically connected (in phantom) to a control mechanism 102 for controlling the swallowing capacity and/or efficiency of the turbine 24, wherein the illustrated control mechanism 102 may include one or more known mechanisms for controlling the turbocharger swallowing capacity and/or the turbocharger efficiency. The control circuit 50 is configured to control the operation of the control mechanism 102 by producing one or more appropriate signals on signal path 100. The control mechanism 102 may be or include any one or combination of a conventional variable geometry turbine (VGT) configured to selectively modulate the physical geometry and exhaust flow capacity of the turbine 24, a conventional wastegate configured to selectively divert exhaust gas away from the turbine 24, and a conventional exhaust throttle configured to selectively modulate the flow rate of exhaust gas through the exhaust gas conduits 30 and 32.

It will be understood that the sensors and actuators described with respect to FIG. 1 are illustrative in nature, and that more, fewer or different sensors and/or actuators may alternatively be provided. Any specific collection of sensors and actuators will typically be dictated by a number of factors including, but not limited to, engine configuration, e.g., whether a turbocharger 25 and/or EGR system 45 is provided, etc., turbocharger configuration if one is provided, EGR system configuration if one is provided, sensor and total system cost, configuration and required inputs of estimation models used, and the like.

Figure 2B:
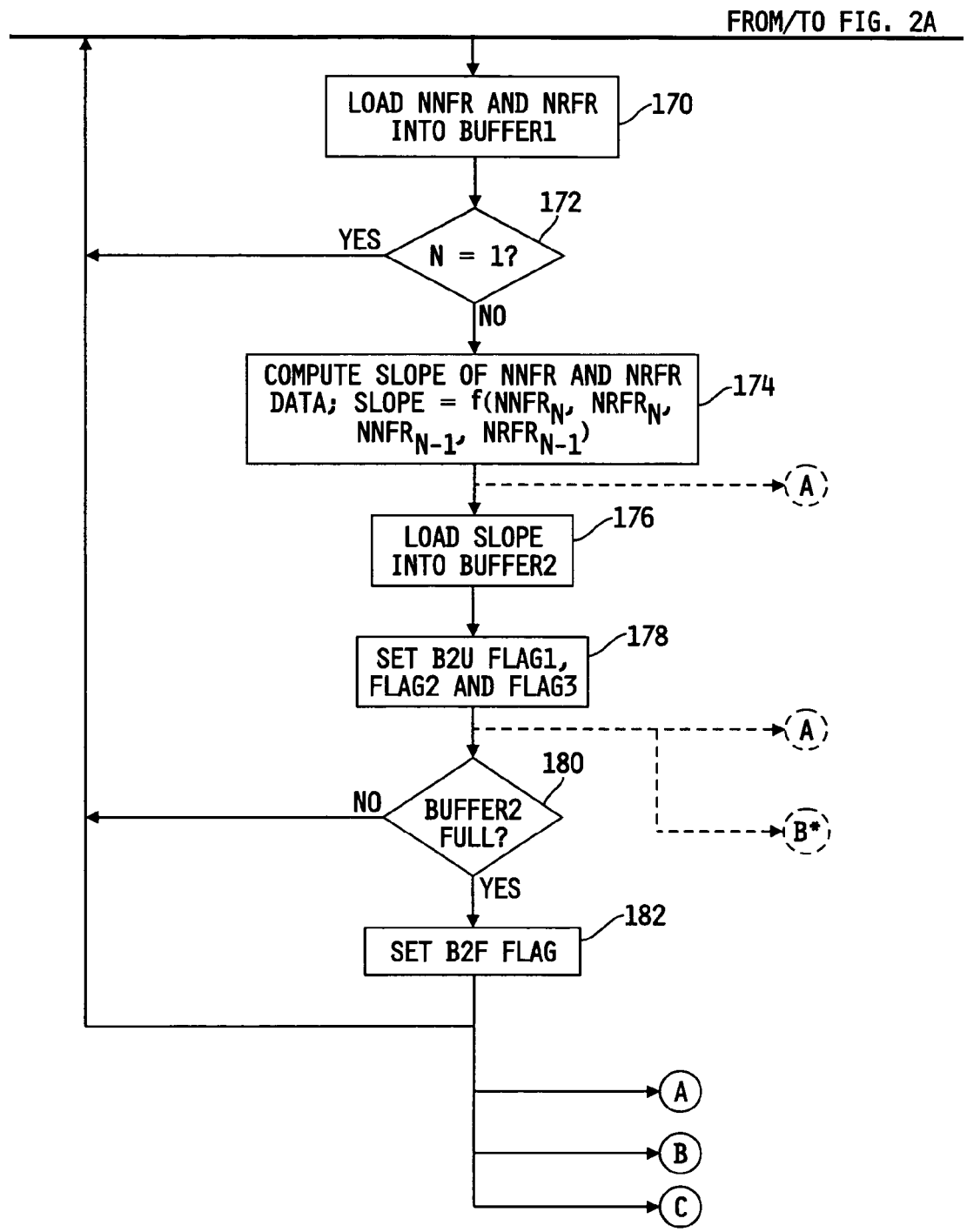

Referring now to FIGS. 2A and 2B, a flowchart of one illustrative embodiment of a software algorithm 150 for determining a reagent solution quality indicator using the system of FIG. 1 is shown. The algorithm 150 is stored in memory 55 of the control circuit 50, and is executed by the control circuit 50 as described hereinafter. The algorithm 150 begins at step 152 where the control circuit 50 is operable to set a counter, N, equal to a predefined count value; e.g., 1. Thereafter at step 154, the control circuit 50 is operable to reset a B2F flag, wherein the B2F flag corresponds to the status; e.g., full or not full, of a second data buffer as will be described in greater detail hereinafter. As a result of step 154, the reset B2F flag indicates that the second data buffer is not full. Following step 154, algorithm execution advances to step 156 where the control circuit 50 is operable to monitor a number of diagnostic enable conditions. Thereafter at step 156, the control circuit 50 is operable to determine whether all of the diagnostic enable conditions have been satisfied. If not, execution of the algorithm 150 loops back to step 156. If, on the other hand, the control circuit 50 determines at step 158 that all of the diagnostic enable conditions are satisfied, algorithm execution advances to step 160.

In one embodiment, the control circuit 50 is operable to execute steps 156 and 158 by monitoring the engine operating parameters set forth in the following Table 1, and comparing these various engine operating parameters to corresponding parameter thresholds or ranges also set forth in Table 1. If all of these enabling conditions are satisfied, algorithm execution advances to step 160, and otherwise it loops from step 158 back to step 156 until the conditions set forth in Table 1 are satisfied.

TABLE 1

| Engine Operating Parameter | Enabling Threshold or Range |
| --- | --- |
| Emissions catalyst temperature (CT) | $CT_L < CT < CT_H$ |
| Engine speed (ES) | $ES_L < ES$ |

In Table 1, the temperature, CT, of the emissions catalyst 34 must be between specified low and high catalyst temperatures, $CT_L$ and $CT_H$ respectively. It is desirable to set $CT_L$ at a temperature above which the engine 12 and emissions catalyst 34 are considered to be warmed up and operating normally, and to set $CT_H$ at a temperature below which the emissions catalyst 34 is considered to be operating at a normal and desirable temperature. As a further diagnostic enable condition, the engine speed, ES, must be greater than a low engine speed, ESL to ensure production of some detectable amount of NOx. It is desirable to enable execution of the algorithm 150 only under normal engine operating conditions to facilitate accuracy of the data, and in this regard the thresholds and ranges defined in Table 1 should be selected such that the diagnostic enable conditions are satisfied only during normal engine and emissions catalyst operation.

Those skilled in the art will recognize that Table 1 represents only one illustrative collection of diagnostic enable conditions, and that this collection may alternatively exclude one or more of the listed conditions and/or include one or more other engine and/or system operating conditions that are not listed in Table 1. Any such alternate collection of diagnostic enable conditions will typically be dictated by the application and/or desired accuracy of the algorithm 150, and is in any case intended to fall within the scope of the claims appended hereto.

From the "yes" branch of step 158, algorithm execution advances to step 160 where the control circuit 50 is operable to determine the NOx flow rate, NFRU, upstream of the emissions catalyst 34. In embodiments of the system 10 that do not include the EGR system 45, the control circuit 50 may illustratively be operable to execute step 160 by estimating NFRU as a function, empirical fit or analytic correlation of the start-of-injection value, SOI, that is computed by the control circuit 50 as described hereinabove, the fuel flow value, FF, that is computed by the control circuit 50 as described hereinabove, the engine speed signal, ES, produced by the engine speed sensor 52, and an intake air flow rate, AF, corresponding to the mass flow rate of air entering the intake manifold 14, or NFRU=f(SOI, FF, ES, AF).

In one illustrative embodiment, the control circuit 50 is operable to compute an estimate of the intake air flow value, AF, by first computing an estimate of the volumetric efficiency ($\eta_V$) of the air intake system, and then computing AF as a function of $\eta_V$ using a conventional speed/density equation. Any known technique for estimating $\eta_V$ may be used, and in one illustrative embodiment, $\eta_V$ is computed according to a known Taylor mach number-based volumetric efficiency equation given as:

$$\eta_V = A_1 * \{(Bore/D)^2 * (stroke*ES)^B / sqrt(\gamma*R*IMT) * [(1+EXP/IAP) + A_2]\} + A_3 \quad (1),$$

where, $A_1$, $A_2$, $A_3$ and B are all calibratible parameters fit to the volumetric efficiency equation based on mapped engine data, Bore is the intake valve bore length, D is the intake valve diameter, stroke is the piston stroke length, wherein Bore, D and stroke are dependent upon engine geometry, $\gamma$ and R are known constants (e.g., $\gamma*R=387.414$ J/kg/deg K), ES is engine speed, and is obtained in the illustrated embodiment by monitoring the engine speed signal produced by the engine speed sensor 52, IAP is intake air pressure, and is obtained in the illustrated embodiment by monitoring the intake air pressure signal produced by the intake air pressure sensor 56, IMT is intake manifold temperature, and is obtained in the illustrated embodiment by monitoring the intake manifold temperature signal produced by the intake manifold temperature sensor 57, and EXP is exhaust pressure, and is obtained in the illustrated embodiment by monitoring the exhaust pressure signal produced by the exhaust pressure sensor 61.

It will be appreciated that any one or more of the parameter values used in equation (1) above that are obtained from sensor signals may alternatively or additionally be determined by one or more known parameter estimation algorithms. For example, the intake air pressure value, IAP, may alternatively be estimated as a known function of turbocharger compressor inlet temperature, compressor inlet pressure, turbocharger rotational speed, and engine rotational speed, as described in U.S. Pat. No. 6,698,203, which is assigned to the assignee of the subject invention, and the disclosure of which is incorporated herein by reference. As another example, the engine exhaust pressure value, EXP, may alternatively be estimated as a known function of intake air pressure, IAP, and one or more turbocharger command values; e.g., VGT, in embodiments that do not include the EGR system 45, and further as a function of the position of the EGR valve 48 in embodiments that do include the EGR system, as described in U.S. Pat. No. 6,732,522, which is assigned to the assignee of the subject invention, and the disclosure of which is incorporated herein by reference. U.S. Pat. No. 5,753,805 discloses a method for estimating pressure at any given node in an internal combustion engine, and the concepts described in this document may be alternatively or additionally implemented to estimate exhaust pressure for use in equation (1). The disclosure of U.S. Pat. No. 5,753,805 is also incorporated herein by reference. Those skilled in the art will recognize other techniques for estimating or otherwise determining the parameters ES, IAP, IMT and/or EXP, and such other techniques are intended to fall within the scope of the claims appended hereto.

With the volumetric efficiency value $\eta_V$ estimated according to equation (1), the air flow value, AF, may be computed according to the equation:

$$AF = \eta_V * V_{DIS} * ES * IMP / (2*R*IMT) \quad (2),$$

where, $\eta_V$ is the estimated volumetric efficiency determined by equation (1), $V_{DIS}$ is engine displacement and is generally dependent upon engine geometry, ES is engine speed, IMP is the intake manifold pressure, R is a known gas constant (e.g., R=53.3 ft-lbf/lbm ° R or R=287 J/Kg ° K), and IMT is the intake manifold temperature.

Those skilled in the art will recognize other techniques for estimating or otherwise determining the mass flow rate, AF, of air entering the intake manifold 14, and such other techniques are intended to fall within the scope of the claims appended hereto.

In embodiments of the system 10 that do include the EGR system 45, the control circuit 50 may illustratively be operable to execute step 160 by estimating NFRU as a known function of exhaust gas temperature, $T_{EX}$ and EGR fraction, EGRFRAC, as described in U.S. Pat. No. 6,697,729, which is assigned to the assignee of the subject invention, and the disclosure of which is incorporated herein by reference. Alternatively or additionally, the control circuit 50 may be operable at step 160 to estimate NFRU according to a function, empirical fit or analytic correlation of the start-of-injection value, SOI, that is computed by the control circuit 50 as described hereinabove, the fuel flow value, FF, that is computed by the control circuit 50 as described hereinabove, the engine speed signal, ES, produced by the engine speed sensor 52, a charge flow rate, CF, corresponding to the mass flow of charge (combination of fresh air and recirculated exhaust gas supplied to the intake manifold 14) and an EGR fraction value, EGRFRAC, corresponding to the fraction of the charge that is recirculated exhaust gas, or NFRU=f(SOI, FF, ES, CF, EGRFRAC). In either of these embodiments, the charge flow value, CF, may illustratively be determined according to equations (1) and (2) above by replacing AF with CF. In such embodiments, however, an exhaust pressure sensor 61 or exhaust pressure estimation algorithm will not be necessary if the EGR system 45 includes one or more sensors for determining a pressure differential, $\Delta P$, across the EGR valve 48 or other flow restriction orifice disposed in line with the EGR conduit 46. In such cases, the exhaust pressure value, EXP, may be computed directly according to the equation EXP=IAP+$\Delta P$. The EGR fraction value, EGRFRAC, may then be determined as a ratio of an EGR flow rate, EGRFR and the charge flow value, CF, such as described in U.S. Pat. No. 6,697,729 previously incorporated herein by reference, for example, wherein EGRFR may be estimated as a function of the effective flow area, EFA, through the EGR valve 48 or other flow restriction orifice disposed in-line with the EGR conduit 46, $\Delta P$, IAP and exhaust gas temperature, $T_{EX}$. It will be understood that many techniques for empirically fitting or analytically correlating one or more parameters to estimated values, as described hereinabove, are known, and any such conventional techniques are within the knowledge of a skilled artisan. Additionally, those skilled in the art will recognize other techniques for estimating or otherwise determining the NOx flow rate, NFRU, upstream of the emissions catalyst 34, and such other techniques are intended to fall within the scope of the claims appended hereto.

In an alternative embodiment, the control circuit 50 may be operable at step 160 to estimate NFRU according to one or more other known functions of any number of engine operating parameters. Alternatively still, in embodiments of the system 10 that include the NOx concentration sensor 84 and the mass flow sensor 88, the control circuit 50 may be operable to determine the NOx flow rate upstream of the emissions catalyst 34 as a known function of the NOx concentration upstream of the emissions catalyst 34, corresponding to the upstream NOx concentration signal, NCU, produced by the NOx concentration sensor 84, and the exhaust gas flow rate, corresponding to the exhaust gas mass flow rate signal, MFE, produced by the mass flow sensor 86.

In embodiments of the system 10 that do not include the turbocharger 25 or EGR system 45, NFRU corresponds to the flow rate of NOx produced by the engine 12 resulting from the combustion of fuel mixed with naturally aspirated air. In embodiments of the system 10 that include the turbocharger 25 but not the EGR system 45, NFRU, corresponds to the flow rate of NOx produced by the engine 12 resulting from the combustion of fuel mixed with boost intake air supplied by operation of the turbocharger 25. In embodiments of the system 10 that include the EGR system 45, NFRU, corresponds to the flow rate of NOx produced by the engine 12 resulting from the combustion of fuel mixed with the combination of either naturally aspirated (no turbocharger 25) or boost intake air (with the turbocharger 25) with recirculated exhaust gas, less the flow rate of NOx recirculated to the intake conduit 20 via the EGR system 45.

Following step 160, execution of the algorithm 150 advances to step 162 where the control circuit 50 is operable to determine the NOx flow rate, NFRD, downstream of the emissions catalyst 34. In the illustrated embodiment, the control circuit 50 is operable to execute step 162 by computing NFRD as a known function of the NOx concentration downstream of the emissions catalyst 34, corresponding to the downstream NOx concentration signal, NCD, produced by the NOx concentration sensor 68, and an exhaust gas flow rate, EFR. In embodiments of the system 10 that do not include the EGR system 45, the control circuit 50 may illustratively be operable to execute step 162 by estimating EFR as a function, empirical fit or analytic correlation of the engine speed signal, ES, produced by the engine speed sensor 52, and the volumetric efficiency value, $\eta_V$, computed, for example, according to equation (1) above. Alternatively, EFR may be determined directly from a conventional turbocharger map as a function of turbocharger rotational speed and the pressure differential between the turbocharger turbine and compressor. In embodiments of the system 10 that include the EGR system 45, the control circuit 50 may illustratively be operable to execute step 162 by estimating EFR as a function, empirical fit or analytic correlation of the engine speed signal, ES, produced by the engine speed sensor 52, the volumetric efficiency value, $\eta_V$, computed, for example, according to equation (1) above and an EGR fraction value, EGRFRAC, corresponding to the fraction of the total charge provided to the intake manifold 14 that is recirculated exhaust gas. EGR fraction may be determined according to any conventional technique, and three examples of known techniques for estimating EGRFRAC are disclosed in published U.S. Pat. No. 6,697,729, which has been incorporated herein by reference, published U.S. patent application No. US 20020100463, which is assigned to the assignee of the subject invention and the disclosure of which is incorporated herein by reference, and U.S. Pat. No. 6,601,387, the disclosure of which is incorporated herein by reference. It will be understood that many techniques for empirically fitting or analytically correlating one or more parameters to estimated to an estimated value of EFR, as described hereinabove, are known, and any such conventional techniques are within the knowledge of a skilled artisan. In embodiments of the system 10 that include the mass flow sensor 88, the control circuit 50 may alternatively be operable to determine EFR directly from the exhaust gas mass flow signal, MFE, produced by the mass flow sensor 88.

Alternatively, the control circuit 50 may be operable at step 162 to estimate NFRD as a known function, empirical fit or analytical correlation of one or more engine 12, air handling system 18 and/or emissions catalyst 34 operating parameters. Alternatively still, it is contemplated that the subject matter of this invention may be used in applications wherein the exhaust gas flow rate, EFR, and NOx flow rates and/or concentrations are known, and in such systems these value may be stored in memory 55 or otherwise be provided in the form of one or more constant values. In such embodiments, at least the steps 160 and 162 of algorithm 150 may be modified to require only that the EFR and/or NOx flow rates and/or concentrations be supplied to the control circuit 50.

The data sampling rate of operating parameters required for the execution of steps 160 and 162 may be any desired sampling rate, and in one illustrative embodiment the data sampling rate is, for example and without limitation, set to result in filtered 1–5 second samples of NOx flow rate and reagent solution flow rate.

From step 162, execution of the algorithm 150 advances to step 164 where the control circuit 50 is operable to determine a normalized NOx flow rate, NNFR, corresponding to a normalized representation of the flow rate of NOx reduced from the engine exhaust gas by the emissions catalyst 34. In the illustrated embodiment, the control circuit 50 is operable to execute step 164 by computing NNFR as a function of the NOx flow rate, NFRU, upstream of the emissions catalyst 34, the NOx flow rate, NFRD, downstream of the emissions catalyst 34, and a calibratible maximum NOx flow rate value, MAXN, corresponding to a maximum possible NOx flow rate produced by the engine 12. As one illustrative example, the control circuit 50 is operable at step 164 to determine NNFR according to the equation NNFR=(NFRU−NFRD)/MAXN, where the quantity (NFRU−NFRD) represents the flow rate of NOx reduced from the engine exhaust gas by the emissions catalyst 34, and NNFR represents this NOx flow rate normalized to the value MAXN. It will be understood, however, that the control circuit 50 may alternatively be operable to compute NNFR according to other functions of NFRU, NFRD and MAXN, or to compute NNFR as a known function of NFRU and/or NFRD and one or more other dynamic or static operating parameters, functions or values.

Execution of the algorithm 150 advances from step 164 to step 166 where the control circuit 50 is operable to determine a flow rate, RFR, of the reagent solution from the reagent source 38 into the emissions catalyst 34. In one embodiment, the control circuit 50 is operable to determine the reagent solution flow rate, RFR, directly from the reagent solution flow signal produced by the flow meter 64. Alternatively, the control circuit 50 may be operable to execute step 166 by computing RFR as a known function of the reagent pump control signal, RPC, and information relating to the physical characteristics of the reagent solution pump 42, and/or reagent solution injection nozzle 44. In any case, execution of the algorithm 150 advances from step 166 to step 168 where the control circuit 50 is operable to determine a normalized reagent solution flow rate, NRFR, corresponding to a normalized representation of the flow rate of the reagent solution from the reagent source 38 into the emissions catalyst 34. In the illustrated embodiment, the control circuit 50 is operable to execute step 168 by computing NRFR as a function of the reagent solution flow rate, RFR, and a calibratible maximum reagent solution flow rate value, MAXR, corresponding to a maximum reagent solution flow rate based on stoichiometry, desired reagent solution quality catalyst capacity for a new or undamaged catalyst. As one illustrative example, the control circuit 50 is operable at step 168 to determine NRFR according to the equation NRFR=RFR/MAXR. It will be understood, however, that the control circuit 50 may alternatively be operable to compute NRFR according to other functions of RFR and MAXR, or to computer NRFR as a known function of RFR and one or more other dynamic or static operating parameters, functions or values.

From step 168, algorithm 150 advances to step 170 where the control circuit 50 is operable to load the computed NNFR and NRFR values into a first data buffer or buffer1. Buffer1 may illustratively be a conventional rolling buffer configured to hold a predefined number; e.g., 5–100, of data pairs such that when the buffer is full, the newest data pair entering the buffer pushes out the oldest data pair so that the buffer always holds the most recent predefined number of data pairs. In one specific embodiment, for example and without limitation, buffer1 is a rolling buffer configured to hold 30 data pairs. Alternatively, buffer1 may be configured as one or more other conventional data buffers, and algorithm 150 may, in such embodiments, including conventional steps for maintaining a desired number of the most recent data pairs therein. Following step 170, the control circuit 50 is operable at step 172 to determine whether the counter, N, is equal to 1. If so, then only one NNFR, NRFR data pair exists in buffer1 and algorithm execution advances to step 184 where the control circuit 50 increments N by 1, and then back to step 156 to compute another NNFR, NRFR data pair. If, on the other hand, the control circuit 50 determines at step 172 that N is not equal to one, then more than one NNFR, NRFR data pairs exist in buffer1 and algorithm execution advances to step 174 where the control circuit 50 is operable to compute a slope of the NNFR, NRFR data contained in buffer1. In one embodiment, the control circuit 50 is operable to execute step 174 by computing a slope point as a known function of the "k" most recent data pairs contained in buffer1, wherein "k" may be any positive integer greater than 1 and up to the entire contents of buffer1. The control circuit 50 may be operable at step 174 to compute the slope of the NNFR, NRFR data contained in buffer1 according to any one or more known data slope determination techniques including, for example, a conventional two-point linear slope determination technique, a conventional k-point regression techniques, or the like.

From step 174, algorithm execution advances to step 176 where the control circuit 50 is operable to load the computed slope value into a second data buffer or buffer2. In one embodiment, buffer2 is a conventional rolling buffer configured to hold a predefined number of slope data values such that when the buffer is full, the newest slope data entering the buffer pushes out the oldest slope data so that the buffer always holds the most recent predefined number of slope data values. In one illustrative example, buffer2 is sized to hold 30 slope data values, although buffer2 may be alternatively sized to hold any desired number of slope data value; e.g., 5–100 data values. Alternatively, buffer2 may be configured as one or more other conventional data buffers, and algorithm 150 may, in such embodiments, include conventional steps for maintaining a desired number of the most recent slope data values therein. Following step 176, the control circuit 50 is operable at step 178 to set three flags; B2U Flag1, B2U Flag2 and B2U Flag3, each indicating that buffer2 has been updated with new slope data. Thereafter at step 180, the control circuit 50 is operable to determine whether buffer2 is full, such as by keeping track of the number of executions of step 176 or the like. If not, execution of algorithm 150 loops back to step 160 via step 184. If, on the other hand, the control circuit 50 determines at step 180 that buffer2 is full, algorithm execution advances to step 182 where the control circuit 50 is operable to set a flag, B2F Flag, indicating that buffer2 is full. From step 182, algorithm execution loops back to step 160 via step 184, and also branches to any one or more of three different subroutines A, B and C. Alternatively, as will be described in greater detail hereinafter with respect to the descriptions of subroutines A and B, algorithm 150 may branch to subroutine A following step 174, or may branch to subroutines A and/or B following step 178.

Figure 3:
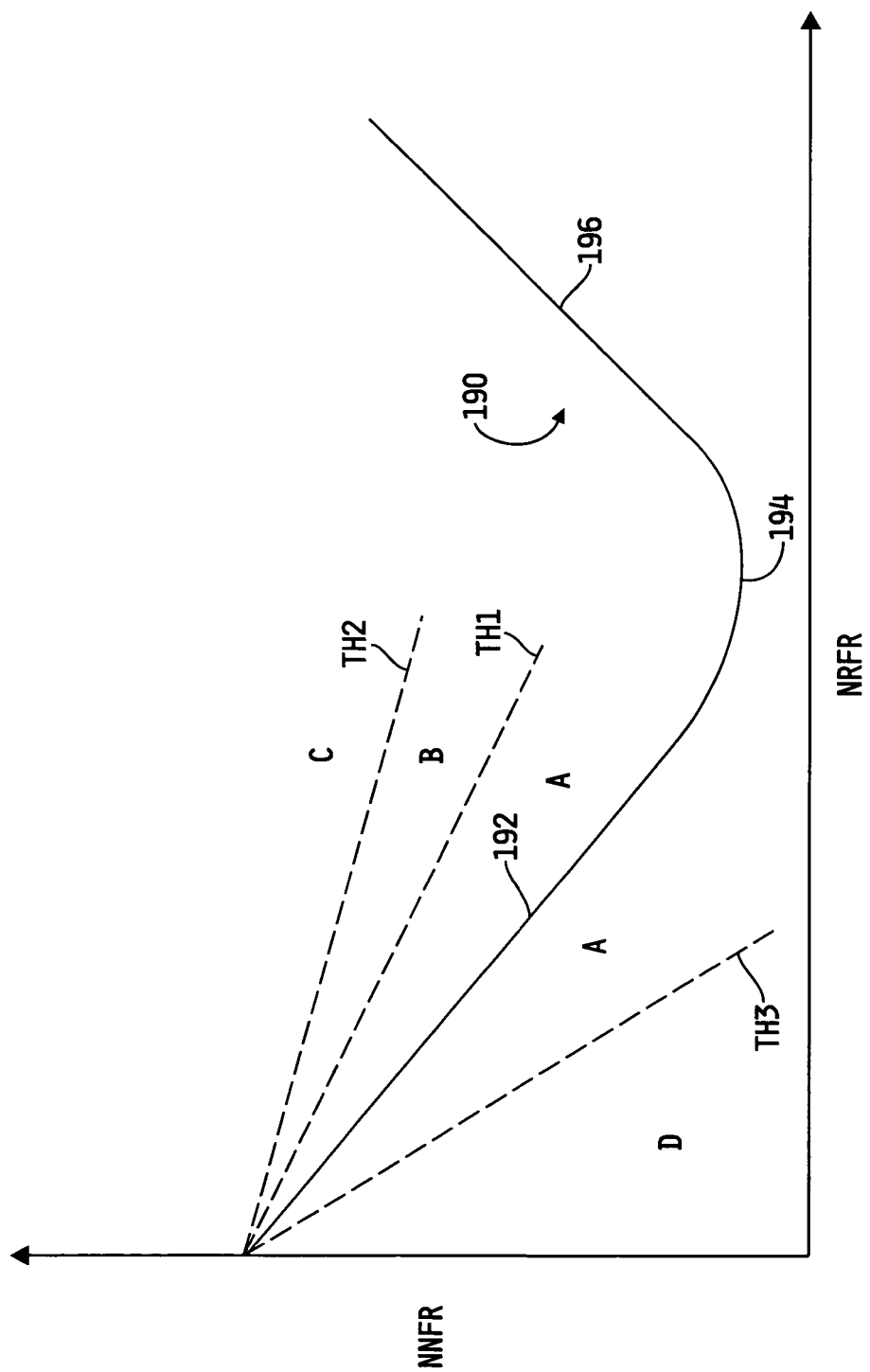
FIG. 3 is a plot of normalized NOx flow rate vs. normalized reagent solution flow rate illustrating the reagent solution quality indicator determined by the software algorithm of FIGS. 2A and 2B.

Algorithm 150 is operable to determine a reagent solution quality indicator in the form of a slope of NOx flow rate and reagent solution flow rate, and to maintain data relating to the flow rates in one buffer and data relating to the slope data in another buffer. Referring to FIG. 3, a plot 190 of normalized NOx flow rate values, NNFR, and normalized reagent solution flow rate values, NRFR, is shown graphically illustrating a typical NNFR, NRFR plot over wide flow rate operating ranges. In the example illustrated in FIG. 3, the region 192 of the plot 190 represents the normal operating region where the capacity of the emissions catalyst 34 is not exceeded, the knee 194 of the plot 190 represents the capacity point of the emissions catalyst 34, and the region 196 of the plot 190 represents the normal operating region where the capacity of the emissions catalyst 34 is exceeded.

The region 192 illustrated in FIG. 3 represents the normal and expected operation of the emissions catalyst 34 when the capacity of the catalyst 34 is not exceeded, and in the illustrated example MAXN and MAXR are selected to normalize the expected slope of the region 192 to −1. Generally, the actual slope of region 192 will vary as a function of the stoichiometry of the NOx reduction reaction within the emissions catalyst 34 so that if the quality of the reagent solution quality is worse or lower than expected the slope of region 192 will be greater than −1, and if the quality of the reagent solution is better or greater than expected the slope of region 192 will be less than −1. Superimposed onto the plot 190 of FIG. 3 are a number of dashed-line thresholds, TH1, TH2 and TH3, each designating reagent solution quality diagnostic thresholds or limits. Between and beyond these diagnostic thresholds, a number of reagent solution quality operating regions, A, B, C and D are defined. If the slope of the region 192 of the plot 190 falls within region "A" defined between the diagnostic thresholds TH1 and TH3, the quality of the reagent solution is deemed acceptable, and in this regard the diagnostic thresholds TH1 and TH3 define therebetween a range of slope values that correspond to acceptable reagent solution quality. If, on the other hand, the slope of the region 192 of the plot 190 falls within region "B" defined between the diagnostic thresholds TH1 and TH2, the quality of the reagent solution is deemed to be of "poor" quality, and in this regard the diagnostic thresholds TH1 and TH2 define therebetween a range of slope values that correspond to poor reagent solution quality. If the slope of the region 192 of the plot 190 falls within region "C" defined as having slope values greater than the diagnostic threshold TH2, the quality of the reagent solution is deemed unacceptable or failed, and in this regard the diagnostic threshold TH2 defines a lower slope limit value above which corresponds to unacceptable or failed reagent solution quality. Finally, if the slope of the region 192 of the plot 190 falls within region "D" defined as having slope values less than the diagnostic threshold TH3, the quality of the reagent solution is deemed to be high quality or to have higher quality than expected, and in this regard the diagnostic threshold TH3 defines an upper slope limit value below which corresponds to high reagent solution quality or higher than expected reagent solution quality.

Figure 4A:
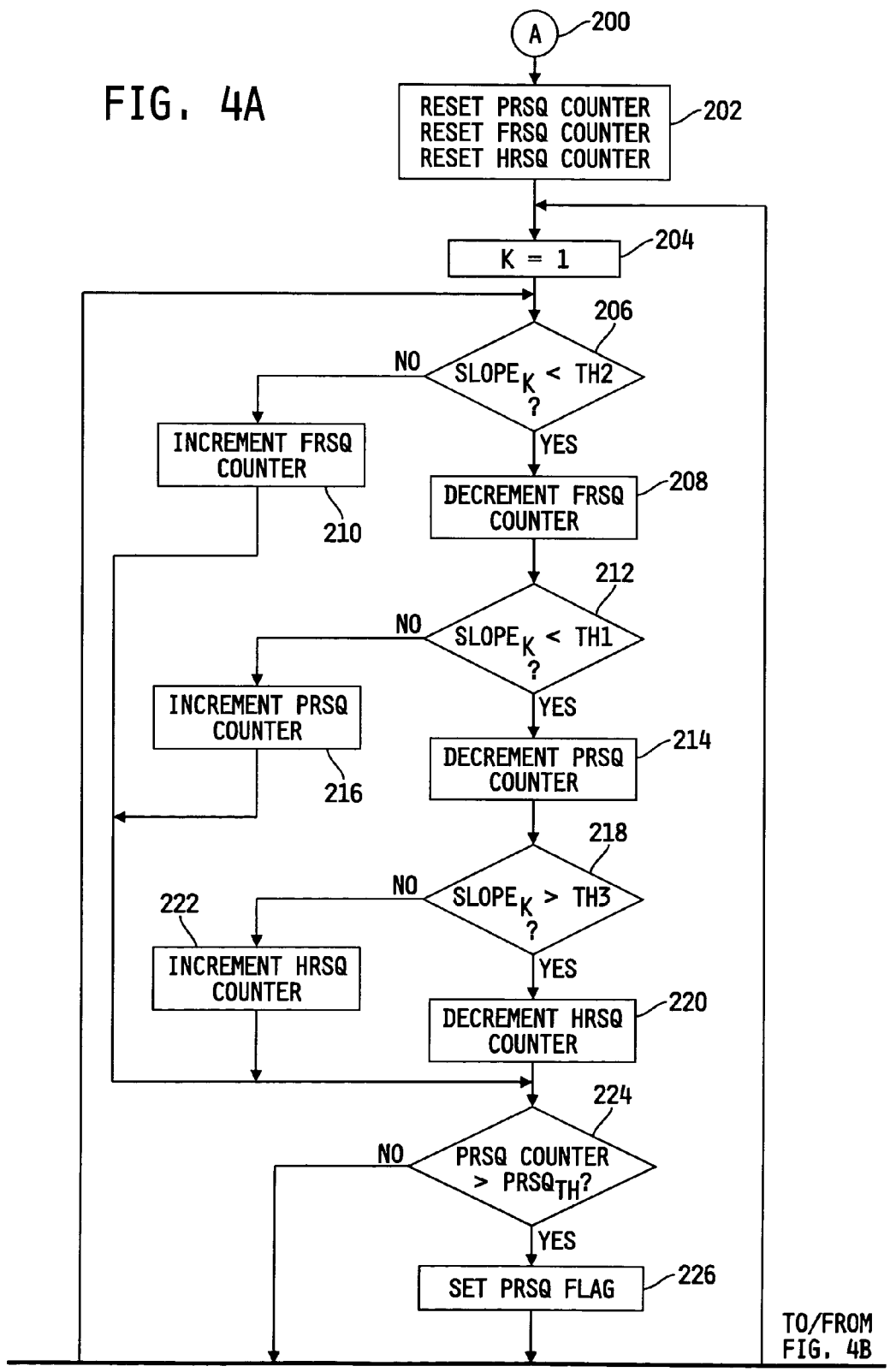
FIGS. 4A and 4B show a flowchart of one illustrative embodiment of a software algorithm for diagnosing reagent solution quality based on the reagent solution quality indicator determined by the software algorithm of FIGS. 2A and 2B.
Figure 4B:
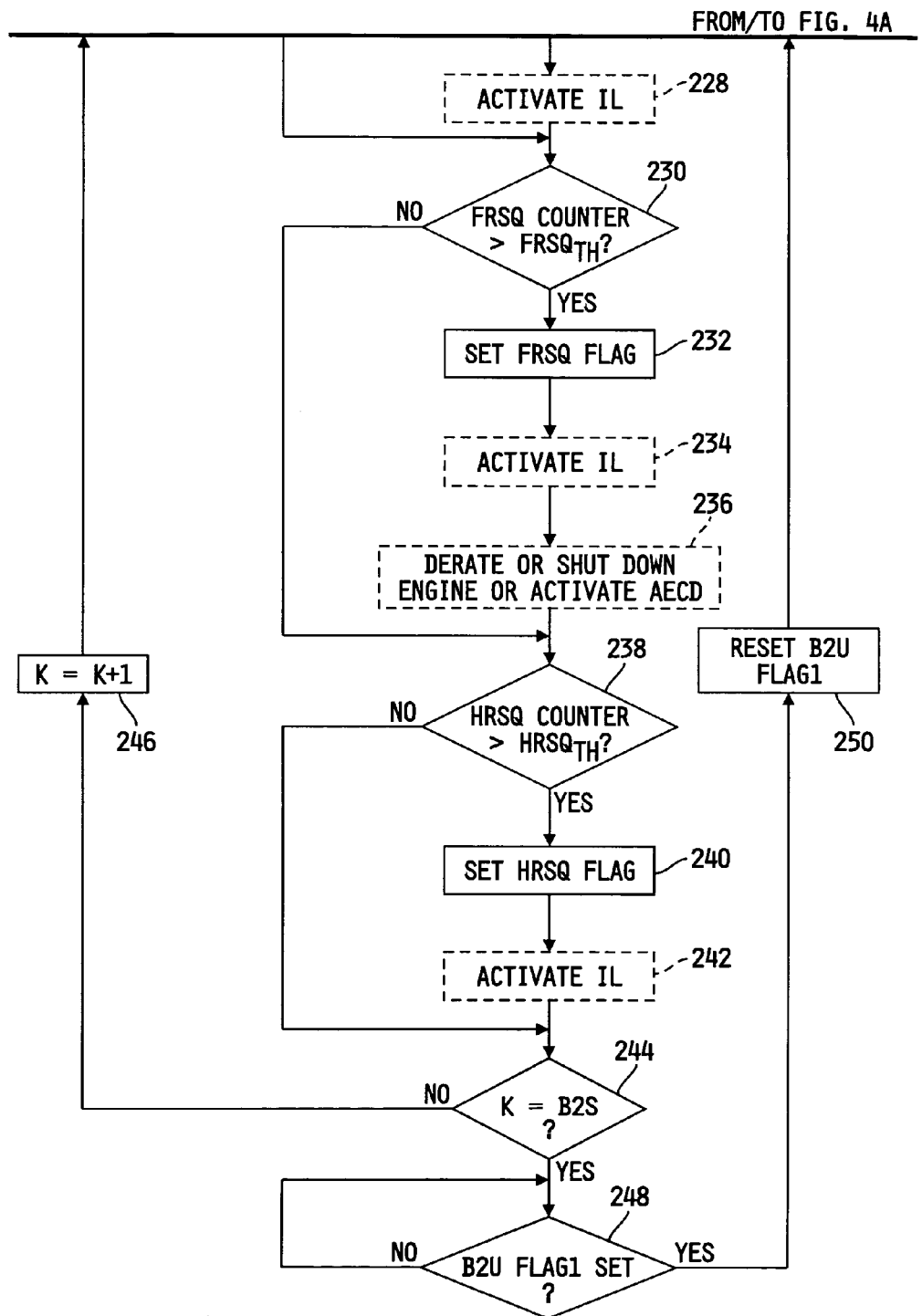

Referring now to FIGS. 4A–4B, a flowchart of one illustrative embodiment of a software algorithm 200 for diagnosing reagent solution quality based on a comparison of the reagent solution quality indicator; e.g., the slope of normalized NOx flow rate vs. normalized reagent solution flow rate, with one or more reagent solution quality thresholds, as illustrated and described with respect to FIG. 3, is shown. The algorithm 200 is stored in memory 55 of the control circuit 50, and is executed by the control circuit 50 as described hereinafter. With respect to the algorithm 150 of FIGS. 2A–2B, the algorithm 200 of FIGS. 4A–4B will be described as having been called by the algorithm 150 following step 182, although it will be understood that in alternative embodiments the algorithm 200 may be called by the algorithm 150 following step 174 or following step 178. Modifications to the algorithm 200 to accommodate such alternative embodiments will be described following the complete description of the algorithm 200 illustrated in FIGS. 4A–4B.

The algorithm 200 begins at step 202 where the control circuit 50 is operable to reset a number of counters. In the illustrated embodiment, the control circuit 50 is operable at step 202 to reset three such counters; namely a poor reagent solution quality (PRSQ) counter, a failed reagent solution quality (FRSQ) counter and a high reagent solution quality (HRSQ) counter. Thereafter at step 204, the control circuit is operable to set the value, K, of another counter equal to a predefined count value; e.g., 1. Following step 204, the control circuit 50 is operable at step 206 to determine whether the "kth" slope value, slopeK, stored in the second buffer, buffer2, is less than the second threshold value, TH2, illustrated in FIG. 3. If so, algorithm execution advances to step 208 where the control circuit 50 is operable to decrement the FRSQ counter. If, on the other hand, the control circuit 50 determines at step 206 that slopeK is greater than or equal to TH2, algorithm execution advances to step 210 where the control circuit is operable to increment the FRSQ counter. Thus, the control circuit 50 is operable at steps 206–210 to increment the failed reagent solution quality (FRSQ) counter if slopek falls within the region "C" of FIG. 3, and to otherwise decrement the FRSQ counter.

Following step 208, the control circuit 50 is operable at step 212 to determine whether the "kth" slope value, slopeK, stored in the second buffer, buffer2, is less than the first threshold value, TH1, illustrated in FIG. 3. If so, algorithm execution advances to step 214 where the control circuit 50 is operable to decrement the PRSQ counter. If, on the other hand, the control circuit 50 determines at step 212 that slopeK is greater than or equal to TH1, algorithm execution advances to step 216 where the control circuit is operable to increment the PRSQ counter. Thus, the control circuit 50 is operable at steps 212–216 to increment the poor reagent solution quality (PRSQ) counter if slopeK falls within the region "B" of FIG. 3, and to otherwise decrement the PRSQ counter.

Following step 214, the control circuit 50 is operable at step 218 to determine whether the "kth" slope value, slopeK, stored in the second buffer, buffer2, is greater than the third threshold value, TH3, illustrated in FIG. 3. If so, algorithm execution advances to step 220 where the control circuit 50 is operable to decrement the HRSQ counter. If, on the other hand, the control circuit 50 determines at step 218 that slopeK is less than or equal to TH3, algorithm execution advances to step 222 where the control circuit is operable to increment the HRSQ counter. Thus, the control circuit 50 is operable at steps 218–222 to increment the high reagent solution quality (HRSQ) counter if slopeK falls within the region "D" of FIG. 3, and to otherwise decrement the HRSQ counter.

In the illustrated embodiment, each of the FRSQ, PRSQ and HRSQ counters may be decremented only to a minimum value that corresponds to a counter reset, and further decrementing of any of these counters will accordingly result in continued resetting thereof. The increment and decrement rates or values per execution of any of steps 208, 210, 214, 216, 220 and 222 may be identical, or the increment rates or values at steps 210, 216 and 222 may alternatively be different (greater or less) than the decrement rates or values at step 208, 214 and 220. In one implementation, for example, the decrement rates or values at steps 208, 214 and 220 may be faster, e.g. four times faster, than the increment rates or values at steps 210, 216 and 222.

Execution of the algorithm 200 advances from any of the steps 210, 216, 220 and 222 to step 224 where the control circuit 50 is operable to determine whether the count value of the PRSQ counter has exceeded a poor reagent solution quality count value, $PRSQ_{TH}$. If so, algorithm execution advances to step 226 where the control circuit 50 is operable to set a poor reagent solution quality (PRSQ) flag, wherein the PRSQ flag may be either one or both of a flag internal to the control circuit 50 or a flag that is broadcast by the control circuit 50 on a conventional data link (not shown), such as a conventional Society of Automotive Engineers (SAE) J1587/J1708 or J1939 data link. Additionally, as shown in phantom in FIG. 4B, the algorithm 200 may include step 228 following step 226 where the control circuit 50 is operable to activate an appropriate one or more of the indicator lamps, IL, 80 shown in FIG. 1.

Algorithm execution advances from step 228 (or from step 226 if step 228 is not included) and from the "no" branch of step 224 to step 230 where the control circuit 50 is operable to determine whether the count value of the FRSQ counter has exceeded a failed reagent solution quality count value, $FRSQ_{TH}$. If so, algorithm execution advances to step 232 where the control circuit 50 is operable to set a failed reagent solution quality (FRSQ) flag, wherein the FRSQ flag may be either one or both of a flag internal to the control circuit 50 or a flag that is broadcast by the control circuit 50 on a conventional data link as described hereinabove. Additionally, as shown in phantom in FIG. 4B, the algorithm 200 may include step 234 following step 232 where the control circuit 50 is operable to activate an appropriate one or more of the indicator lamps, IL, 80 shown in FIG. 1. Alternatively or additionally, also as shown in phantom in FIG. 4B, the algorithm 200 may include step 236 following step 234 (or following step 232 in embodiments where step 234 is not included) where the control circuit 50 is operable to derate the engine 12 by controlling the one or more fuel signals supplied to the fuel system 72 in a known manner to reduce the performance of the engine 12, or to shut down the engine 12 using any known engine shut down technique, or to activate one or more auxiliary emissions control devices (AECDs). As is known in the art, an AECD is typically provided in the form of one or more software algorithms resident within the control circuit 50, and executable by the control circuit 50 to alter operation of the engine 12 under specified circumstances in a manner that allows the engine 12 to at least temporarily produce emissions in excess of one or more specified engine emissions targets.

Algorithm execution advances from step 236 (or from step 234 if step 236 is not included, or from step 232 if neither of steps 234 or 236 are included) and from the "no" branch of step 230 to step 238 where the control circuit 50 is operable to determine whether the count value of the HRSQ counter has exceeded a high reagent solution quality count value, $HRSQ_{TH}$. If so, algorithm execution advances to step 240 where the control circuit 50 is operable to set a high reagent solution quality (HRSQ) flag, wherein the HRSQ flag may be either one or both of a flag internal to the control circuit 50 or a flag that is broadcast by the control circuit 50 on a conventional data link as described hereinabove. Additionally, as shown in phantom in FIG. 4B, the algorithm 200 may include step 242 following step 240 where the control circuit 50 is operable to activate an appropriate one or more of the indicator lamps, IL, 80 shown in FIG. 1.

Algorithm execution advances from step 242 (or from step 240 if step 242 is not included) and from the "no" branch of step 238 to step 244 where the control circuit 50 is operable to determine whether the count value, K, is equal to the size, B2S, of buffer2. If not, the algorithm advances to step 246 where the control circuit 50 is operable to increment the count value, K, and then loops back to step 206. If, on the other hand, the control circuit 50 determines at step 244 that the count value, K, is equal to the size, B2S, of buffer2, then algorithm execution advances to step 248 where the control circuit 50 is operable to determine whether buffer2 has been updated with new slope information by monitoring the status of the B2U Flag1. If the B2U Flag1 is not set, algorithm execution loops back to continually execute step 248 until the control circuit 50 determines that the B2U Flag1 has been set by the algorithm 150 of FIGS. 2A–2B. When the control circuit 50 determines at step 248 that the B2U Flag1 has been set, algorithm execution advances to step 250 where the control circuit 50 is operable to reset the B2U Flag1, and then loops back to step 204.

Figure 5A:
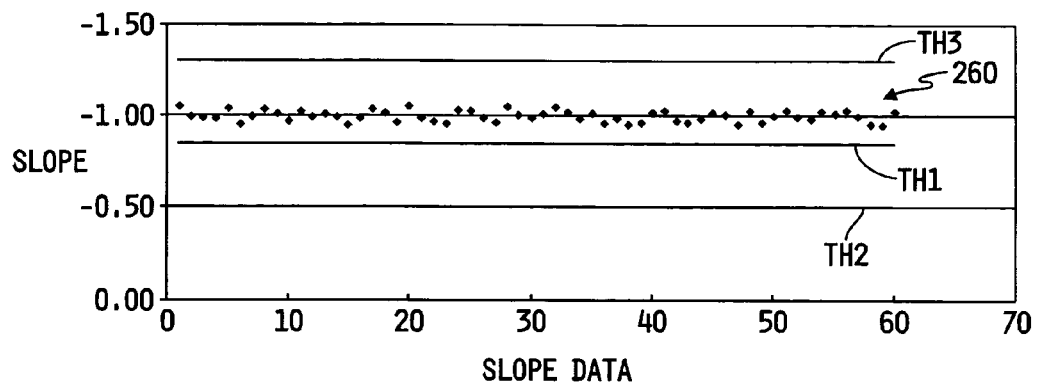
FIG. 5A is a plot of the reagent solution quality indicator over time illustrating determination by the software algorithm of FIGS. 4A and 4B of acceptable quality reagent solution.
Figure 5B:
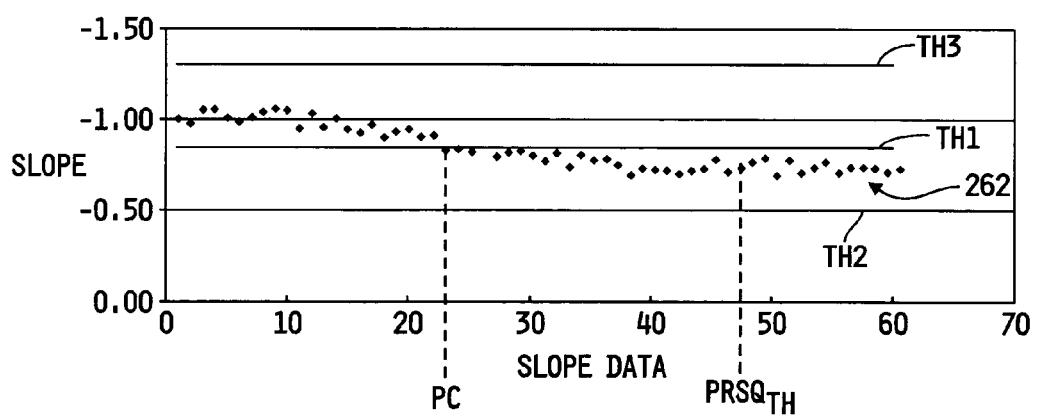
FIG. 5B is a plot of the reagent solution quality indicator over time illustrating determination by the software algorithm of FIGS. 4A and 4B of poor quality reagent solution.

The control circuit 50 is operable, under the direction of the algorithm 200 of FIGS. 4A–4B, to process the slope values in the slope data buffer, buffer2, when buffer2 first becomes full and thereafter whenever it is updated with new slope information, and to increment the FRSQ, PRSQ and HRSQ counters for each consecutive slope value in buffer 2 that falls within the respective "C", "B" and "D" regions of FIG. 3. If, at any time, any of the PRSQ, FRSQ and HRSQ counter values exceed respective counter threshold values, the control circuit 50 is operable to set appropriate flags, and in some embodiments to also activate one or more appropriate indicator lamps. Additionally, if the FRSQ counter value exceeds its counter threshold, the control circuit 50 may be operable to derate the engine 12. Such operation is graphically illustrated in FIGS. 5A–5D. Referring to FIG. 5A, for example, a plot 260 of slope over time vs. slope data points is shown illustrating processing by the algorithm 200 of the slope data contained in the slope buffer, buffer2, for a normally operating emissions catalyst 34 operating in the region 192 of the plot 190 of FIG. 3. Plot 260 illustrates that all of the slope data in buffer2 falls between the thresholds TH1 and TH3, corresponding to region "A" of FIG. 3, indicating that the reagent solution quality is well within its normal, expected operating region. Referring to FIG. 5B, another plot 262 of slope over time vs. slope data points is shown illustrating processing by the algorithm 200 of the slope data contained in the slope buffer, buffer2, for a normally operating emissions catalyst 34 operating in the region 192 of the plot 190 of FIG. 3. Plot 262 illustrates that the first 20 or so slope data points in buffer2 fall between the thresholds TH1 and TH2, corresponding to region "A" of FIG. 1, but that the slope data points thereafter fall between TH1 and TH2, corresponding to region "B" of FIG. 3. The poor reagent solution quality (PRSQ) counter begins incrementing at the point labeled "PC", and in this example the PRSQ counter exceeds the poor reagent solution quality counter threshold at the point labeled $PRSQ_{TH}$. At this point, the control circuit 50 is operable to set the PRSQ flag, and in some embodiments to further activate an appropriate one or more of the indicator lamps.

Figure 5C:
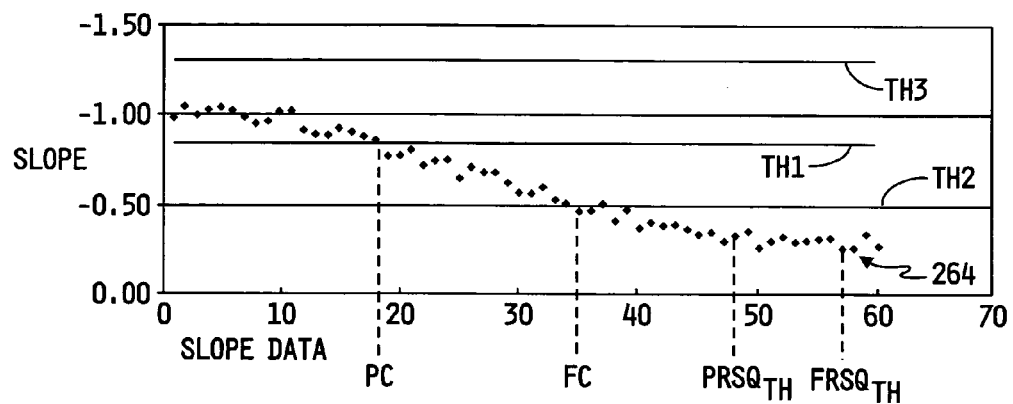
FIG. 5C is a plot of the reagent solution quality indicator over time illustrating determination by the software algorithm of FIGS. 4A and 4B of unacceptably low quality reagent solution.

Referring to FIG. 5C, another plot 264 of slope over time vs. slope data points is shown illustrating processing by the algorithm 200 of the slope data contained in the slope buffer, buffer2, for a normally operating emissions catalyst 34 operating in the region 192 of the plot 190 of FIG. 3. Plot 264 illustrates that the first 18 or so slope data points in buffer2 fall between the thresholds TH1 and TH2, corresponding to region "A" of FIG. 3, the next 20 or so slope data points thereafter fall between TH1 and TH2, corresponding to region "B" of FIG. 3, and the remaining slope data points thereafter falls below TH2, corresponding to region "C" of FIG. 3. The poor reagent solution quality (PRSQ) counter begins incrementing at the point labeled "PC", and in this example the PRSQ counter does not reach $PRSQ_{TH}$ before the slope data points fall below TH2 at the point labeled "FC", so the PRSQ flag in this example is not set. However, in this example the FRSQ counter begins incrementing at "FC" and exceeds the failed reagent solution quality counter threshold at the point labeled $FRSQ_{TH}$. At this point, the control circuit 50 is operable to set the FRSQ flag, and in some embodiments to further activate an appropriate one or more of the indicator lamps and/or to derate the engine 12.

Figure 5D:
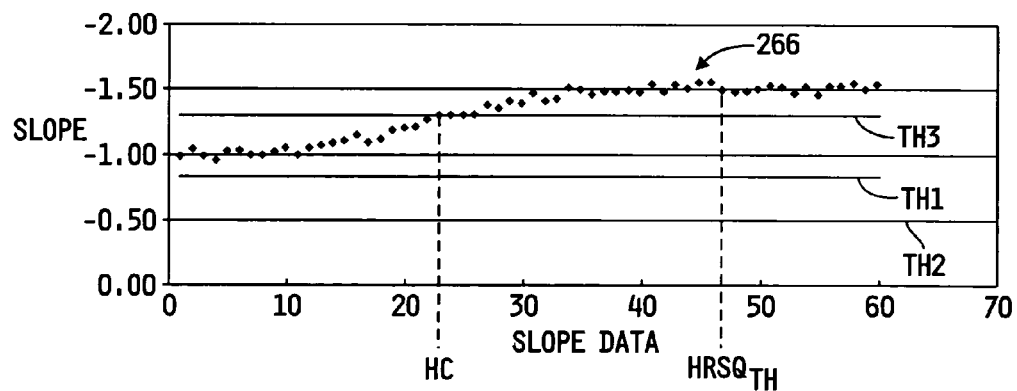
FIG. 5D is a plot of the reagent solution quality indicator over time illustrating determination by the software algorithm of FIGS. 4A and 4B of abnormally high quality reagent solution.

Referring to FIG. 5D, yet another plot 266 of slope over time vs. slope data points is shown illustrating processing by the algorithm 200 of the slope data contained in the slope buffer, buffer2, for a normally operating emissions catalyst 34 operating in the region 192 of the plot 190 of FIG. 3. Plot 262 illustrates that the first 22 or so slope data points in buffer2 fall between the thresholds TH1 and TH3, corresponding to region "A" of FIG. 1, but that the slope data points thereafter fall above TH3, corresponding to region "D" of FIG. 3. The high reagent solution quality (HRSQ) counter begins incrementing at the point labeled "HC", and in this example the HRSQ counter exceeds the high reagent solution quality counter threshold at the point labeled $HRSQ_{TH}$. At this point, the control circuit 50 is operable to set the HRSQ flag, and in some embodiments to further activate an appropriate one or more of the indicator lamps.

In one alternative embodiment of the algorithm 150 of FIG. 3, the algorithm 200 is called following step 174 as shown in phantom in FIG. 2B. In this embodiment, the algorithm 200 is operable to sequentially process the slope data values as soon as they are produced. Modifications to algorithm 200 to accommodate this embodiment would be a mechanical step for a skilled artisan.

In another alternative embodiment of the algorithm 150 of FIG. 3, the algorithm 200 is called following step 178 as shown in phantom in FIG. 2B. In this embodiment, the algorithm 200 is operable to process the contents of the slope buffer, buffer2, as soon as slope data is available including before buffer2 is full. Modifications to algorithm 200 to accommodate this embodiment would be a mechanical step for a skilled artisan.

Figure 6B:
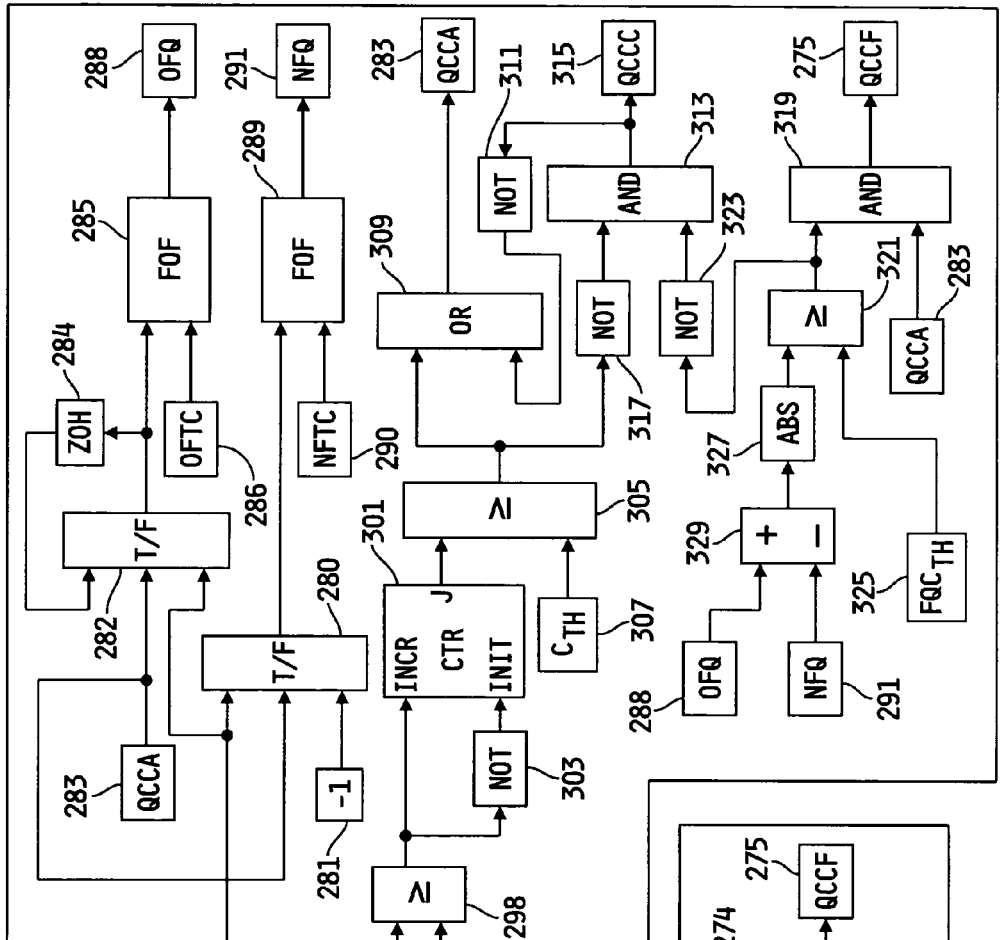
FIG. 6B is a block diagram of one illustrative embodiment of the fluid change algorithm illustrated in FIG. 6A.
Figure 6A:
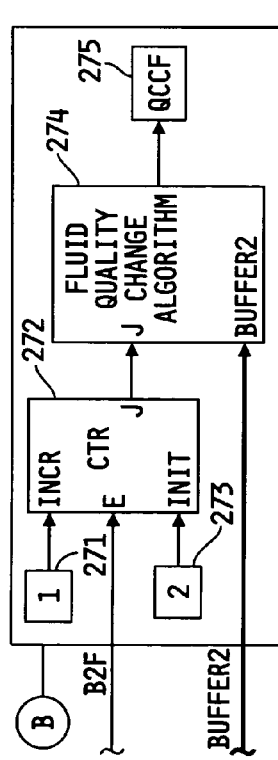
FIG. 6A is a block diagram of one illustrative control algorithm for detecting changes in the quality of reagent fluid based on the reagent solution quality indicator determined by the software algorithm of FIGS. 2A and 2B.

Referring now to FIGS. 6A and 6B, one illustrative embodiment of a control algorithm 270 for detecting changes in the quality of reagent fluid based on the reagent solution quality indicator; e.g., the slope of normalized NOx flow rate vs. normalized reagent solution flow rate, is shown. The algorithm 270 is stored in memory 55 of the control circuit 50, and is executed by the control circuit 50 as described hereinafter. With respect to the algorithm 150 of FIGS. 2A–2B, the algorithm 270 of FIGS. 6A and 6B will be described as having been called by the algorithm 150 following step 182, although it will be understood that in alternative embodiments the algorithm 270 may be called by the algorithm 150 following step 178. Modifications to the algorithm 270 to accommodate such alternative embodiments will be described following the complete description of the algorithm 270 illustrated in FIGS. 6A and 6B.

Referring now to FIG. 6A, the algorithm 270 is illustrated in logic block form, wherein the various logic blocks represent well-known software structures forming the algorithm 270. Algorithm 270 includes a constant block 271 having stored therein a constant value, e.g., 1, which is supplied to an "increment" input, INCR, of a counter block 272. Another constant block 273 has stored therein another constant value, e.g., 2, which is supplied to an initial value input, INIT, of the counter block 272, and the B2F flag, which is set if the slope buffer, buffer2, is full and is otherwise reset, is supplied to an enable input, E, of the counter block 272. The count value output, J, of the counter 272 is supplied to a count input, J, of a fluid quality change algorithm block 274 having a data input, buffer2, incrementally receiving the slope data values in the slope data buffer, buffer2. A fluid quality change output of the algorithm block 274 is received by a quality change flag block 275.

The initial value of the counter block 272, in the illustrated embodiment, is "2", and the counter block 272 increments by "1" at a predefined rate as long as the B2F flag indicates that buffer2 is full. The first count value, J, supplied to the algorithm 274 is thus 2, and occurs as soon as buffer2 is full of slope data.

Referring now to FIG. 6B, one illustrative embodiment of the fluid quality change algorithm 274 of FIG. 6A is shown. Like algorithm 270, algorithm 274 is illustrated in logic block form, wherein the various logic blocks represent well-known software structures forming the algorithm 274. Algorithm 274 includes a data unpacking block 277 having a data input, U, receiving the slope data from the slope data buffer, buffer2, and an enable input receiving the count value, J, from the counter 272 of FIG. 6A. An output, U(E) of block 277 successively and incrementally produces the contents of buffer2, with the next slope data value in buffer2 being produced at U(E) each time the value of the counter, J, increments. The output of the data unpacking block 277, which at any one time is the slope value stored in the Jth location of buffer2, is provided to an input of a filter block 278 having a time constant input receiving a slope time constant from block 279. In the illustrated embodiment, the filter block 278 is a first-order filter, FOF, although the filter block 278 may alternatively be any Nth order filter, wherein "N" is any positive integer. In any case, the output of the filter block 278, corresponding to a filtered representation of the Jth slope data value, is provided to a "true" input of a true/false block 280 and to a "false" input of another true/false block 282. The "false" input of block 280 receives a constant, e.g., −1, from a constant block 281, and a quality change check active, QCCA, flag stored in block 283 provides a control input to true/false block 280 as well as a control input to the true/false block 282. The "true" input of the true/false block 282 is coupled via a zero-order-hold block 284 to the output of block 282, and the output of block 282 is also provided to an input of another filter block 285 having a time constant input receiving an "old fluid" time constant value, OFTC, from block 286. In the illustrated embodiment, the filter block 285 is a first-order filter, FOF, although the filter block 285 may alternatively be any Nth order filter, wherein "N" is any positive integer. The output of the filter block 285 is an old fluid quality value, OFQ, stored in block 288. The output of true/false block 280 is provided to an input of yet another filter block 289 having a time constant input receiving a "new fluid" time constant value, NFTC, from block 290. In the illustrated embodiment, the filter block 289 is a first-order filter, FOF, although the filter block 289 may alternatively be any Nth order filter, wherein "N" is any positive integer. The output of the filter block 289 is a new fluid quality value, NFQ, stored in block 291.

As long as the quality change check active flag, QCCA, is true, as will be described hereinafter, the true/false blocks 280 and 282 produce as outputs their true values, whereas the true/false block 280 produces at its output the current, e.g., Jth, slope value and the true/false block produces as its output a −1, if the QCCA flag is false. Thus, as long as the fluid quality is not being checked, e.g., QCCA flag false, the old fluid quality value, OFQ, stored in block 288 will be the most current, e.g., Jth, slope value extracted from buffer2, and the new fluid quality value, NFQ, stored in block 291 will be −1. During a fluid quality check, e.g., QCCA flag true, the old fluid quality value, OFQ, stored in block 288 will be held at the slope data value that was extracted from buffer2 just prior to the QCCA flag became true, whereas the new fluid quality value, NFQ, stored in block 291 will be incrementally updated with the most current, e.g., Jth, slope value extracted from buffer2.

Another data unpacking block 292 has a data input, U, receiving the slope data from the slope data buffer, buffer2, and an enable input receiving the count value, J, from the counter 272 of FIG. 6A less one resulting from the operation of an arithmetic block 293 and constant block 294 having the value 1 stored therein. An output, U(E) of block 292 successively and incrementally produces the contents of buffer2, with the next slope data value in buffer2 being produced at U(E) of block 292 each time the value of the counter, J, increments. The output of the data unpacking block 292, which at any one time is the slope value stored in the (J−1)th location of buffer2, is provided to an addition input of an arithmetic block 295 having a subtraction input receiving the output of the data unpacking block 277, which at any one time is the slope value stored in the Jth location of buffer2. The output of the arithmetic block is thus the difference between the Jth slope value and (J−1)th slope value, and accordingly represents incremental changes between adjacent slope values in the slope data buffer, buffer2. The slope change value produced by the arithmetic block 295 is supplied as an input to another filter block 296 having a time constant input receiving a slope change time constant, SCTC, from block 297. In the illustrated embodiment, the filter block 296 is a first-order filter, FOF, although the filter block 296 may alternatively be any Nth order filter, wherein "N" is any positive integer. In any case, the output of the filter block 297, corresponding to a filtered representation of the slope change value, is provided to an input of a "greater than or equal to" block 298 having another input receiving a change threshold value, $CH_{TH}$, stored in block 299. The output of the arithmetic block 298 is provided to an increment input, INCR, of a counter block 301, and the output of the arithmetic block 298 inverted by "NOT" block 303 is supplied to an initial value input, INIT, of the counter block 301. The output, J, of the counter block is supplied to one input of another "greater than or equal to" block 305 having another input receiving a counter threshold value, $C_{TH}$, stored in block 307.

When the filtered slope change value produced at the output of the filter block 296, corresponding to a difference between the Jth slope value in buffer2 and the previous slope value in buffer2, exceeds the slope change threshold, $CH_{TH}$, the output of the arithmetic block 298 is "true", and this enables the counter block 301 by setting its increment value to "1". The counter block 301 is disabled as long as the output of block 298 is "false" as its increment value under such conditions is zero. After enablement of the counter block 301, the output of the arithmetic block 305 will switch from "false" to "true" when the count value of the counter block 301 exceeds the count threshold, $C_{TH}$, thereby providing for a delay period following detection of a sufficiently large slope change value before further processing occurs, wherein this delay period is defined as the time required for the counter block 301 to reach $C_{TH}$ from its initial value of zero when the counter block 301 is enabled as just described.

The output of the arithmetic block 305 is provided to a first input of an OR block 309 having a second input receiving the output of a NOT block 311. The input of the NOT block 311 receives the value of a quality change check cancel, QCCC, flag stored in block 315 and produced at the output of an AND block 313. The output of the OR block is stored in block 283 as the quality change check active flag, QCCA. The output of the arithmetic block 305 is also inverted by a NOT block 317 and provided as one input to the AND block 313. A second input of the AND block is received from the output of another NOT block 323 having an input receiving the output of another "greater than or equal to" block 321, which is also provided as one input to another AND block 319. A second input of the AND block 319 is the quality change check active flag, QCCA, stored in block 283, and the output of the AND block 319 is a the quality change flag, QCCF, stored in block 275. One input of the arithmetic block 321 is a fluid quality change threshold value, $FQC_{TH}$, stored in block 325, and another input of the arithmetic block 321 is the output of an absolute value block 327 having an input receiving the output of a difference block 329. The difference block 329 has the old fluid quality value, OFQ, supplied to an addition input thereof and the new fluid quality value, NFQ, supplied to a subtraction input thereof. The output of the absolute value block 327 is thus the absolute difference between the old fluid quality value, OFQ, and the new fluid quality value, NFQ, and the output of the arithmetic block 321 is therefore "true" only when this absolute difference value is greater than or equal to the fluid quality change threshold value, $FQC_{TH}$.

For the purpose of describing the operation of algorithm 274, it will be arbitrarily assumed that algorithm 274 starts up with QCCA "true" and QCCC "false." In this case, OFQ is frozen at its most recent slope value and NFQ is equal to the most recent, e.g., Jth, slope value in buffer2. If the difference between OFQ an NFQ is not greater than $FQC_{TH}$, and the difference between the Jth and (J−1)th slope values is not greater than $C_{TH}$, then the outputs of arithmetic blocks 305 and 321 will both be "false" which, through the action of the OR block 309 will set the quality change check active flag, QCCA, to "false", and through the action of the AND block 313 will set the quality change check cancel flag, QCCC, to "true." This then ensures that the output of the algorithm 274, the quality change flag, QCCF, is false, and causes the true/false blocks 280 and 282 to set OFQ to the most recent, e.g., Jth, slope value and NFQ to −1.

When the slope difference value produced by the filter 296, corresponding to the filtered difference between the Jth and (J−1)th slope values, exceeds $CH_{TH}$, this causes the output of the arithmetic block 305 to switch from "false" to "true" after a delay period defined by the time duration required for the counter block 301 to reach the counter threshold, $C_{TH}$ from its initial value of zero. When the output of block 305 switches to a true state, this causes the OR block 309 to switch the quality change check active flag, QCCA, to "true" and causes the AND block 313 to switch the quality change check cancel flag, QCCC, to "false." OFQ is then equal to the slope value just before QCCA switched to "true", and NFQ is equal to the present, e.g., Jth, slope value. If thereafter the absolute difference between OFQ and NFQ reaches the fluid quality change threshold, $FQC_{TH}$, the output of the arithmetic block 321 switches to "true", and with QCCA already "true", the AND block 319 switches the quality change flag, QCCF, to "true", thereby indicating a significant change in the quality of the reagent solution.

In an alternative embodiment of the algorithm 150 of FIG. 3, the algorithm 270 is called following step 178 as shown in phantom in FIG. 2B. In this embodiment, the algorithm 270 is operable to process the contents of the slope buffer, buffer2, as soon as at least 2 slope data values are available, and in this regard the "B" subroutine is identified as "B*" in FIG. 2B to indicate that the algorithm 150 will require modification to ensure that at least 2 slope data points are resident in buffer2 before algorithm 270 is called. Modifications to the algorithms 150 and 200 to accommodate this embodiment would be a mechanical step for a skilled artisan.

Figure 7:
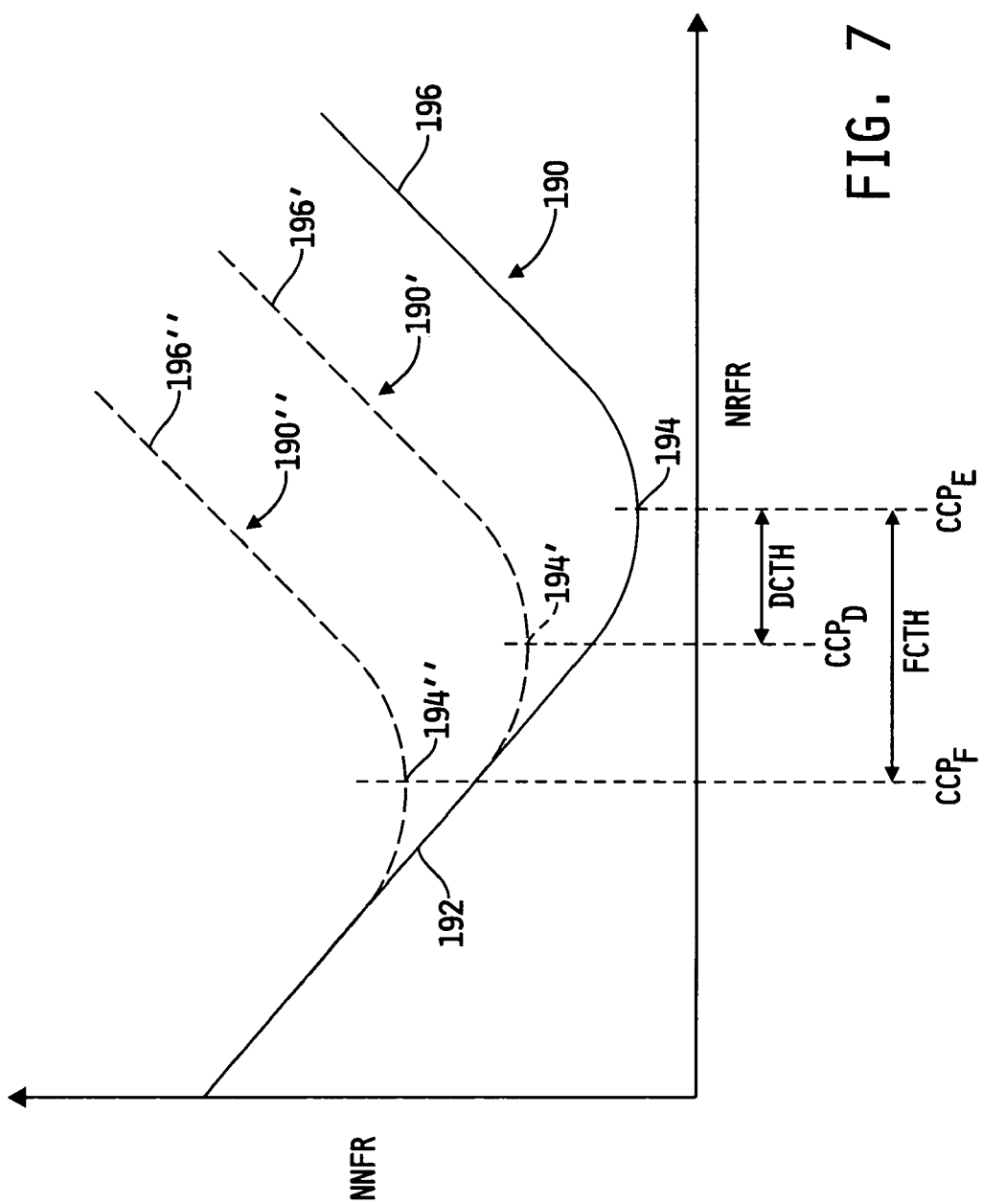
FIG. 7 is a plot of normalized NOx flow rate vs. normalized reagent solution flow rate illustrating effects on the plot of degradation of the emissions catalyst.

As described hereinabove, the knee 194 of the plot 190 illustrated in FIG. 3 represents the capacity point of the emissions catalyst 34, beyond which the catalyst reaction capacity, i.e., the ammonia oxidizing capacity of the emissions catalyst 34, is exceeded. Over time, the ability of the emissions catalyst 34 to reduce NOx may degrade, and such degradation may be observed by tracking the position of the knee 194 relative to an expected position of the knee 194 under normal operating conditions. Referring to FIG. 7, for example, the original plot 190 of FIG. 3 is shown along with a number of dashed-line plots 190' and 190" superimposed onto the plot 190, wherein plots 190' and 190" represent operation of the emissions catalyst 34 in various stages of catalyst degradation.

As described hereinabove, the plot 190 represents the expected operation of a normally functioning emissions catalyst 34, and the knee 194 of plot 190 therefore represents an expected catalyst capacity point, $CCP_E$, corresponding to the point of the plot 190 having substantially zero slope. As the operation of the emissions catalyst 34 degrades, the catalyst capacity point 194 will generally move upwardly relative to the plot 190 toward decreasing NRFR values and increasing NNFR values. In the illustrated example, the dashed-line plot 190' represents a degraded catalyst capacity point, $CCP_D$, corresponding to the position of the catalyst capacity point, relative to $CCP_E$, at the onset of catalyst degradation, and the dashed-line plot 190" represents a failed catalyst capacity point, $CCP_F$, corresponding to the position of the catalyst capacity point, relative to $CCP_E$, at the onset of catalyst failure. The expected catalyst capacity point, $CCP_E$, and the degraded catalyst capacity point, $CCP_D$, define a degraded catalyst threshold value, $DC_{TH}$, therebetween, and the expected catalyst capacity point, $CCP_E$, and the failed catalyst capacity point, $CCP_F$, define a failed catalyst threshold value, $FC_{TH}$, therebetween. In the illustrated example, if the catalyst capacity point of the NNFR vs. NRFR plot falls between $CCP_E$ and $CCP_D$ the emissions catalyst is deemed to be operating normally, if the catalyst capacity point of the NNFR vs. NRFR plot falls between $CCP_D$ and $CCP_F$ the emissions catalyst is deemed to be degraded, and if the catalyst capacity point of the NNFR vs. NRFR plot is more than $FC_{TH}$ below $CCP_E$ the emissions catalyst is deemed to have failed. It will be appreciated that while in the example illustrated in FIG. 7 the catalyst capacity points $CCP_E$, $CCP_D$ and $CCP_F$ are represented as reagent flow rates by mapping the knees 194, 194' and 194" of the respective plots 190, 190' and 190" to normalized reagent flow rate values, these catalyst capacity points may alternatively be represented as NOx flow rate values by mapping the knees 194, 194' and 194" of the respective plots 190, 190' and 190" to normalized NOx flow rate values. Such alternative representations of $CCP_E$, $CCP_D$ and $CCP_F$ are intended to fall within the scope of the claims appended hereto.

Figure 8A:
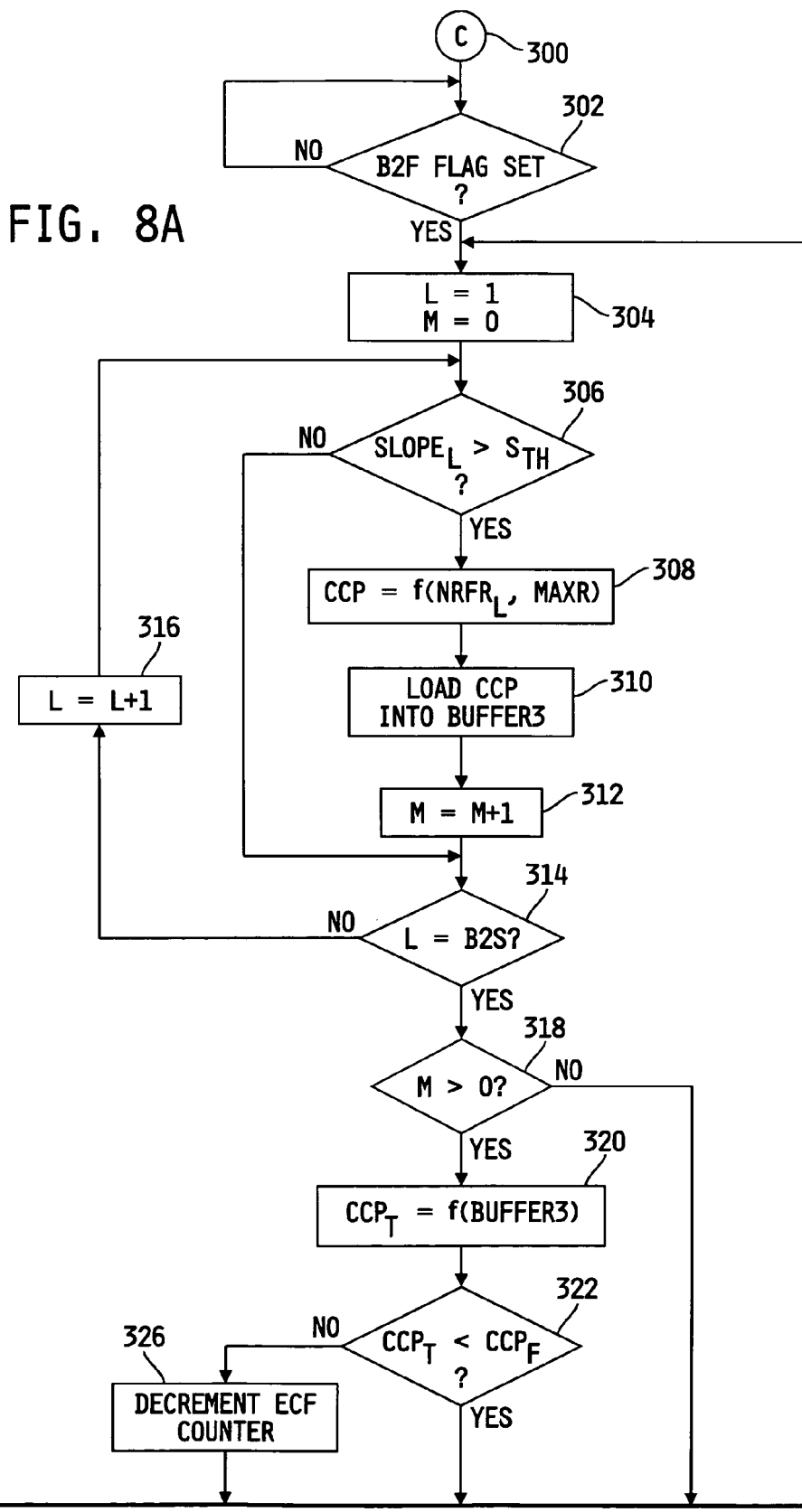
FIGS. 8A and 8B show a flowchart of one illustrative embodiment of a software algorithm for tracking emissions catalyst degradation based on the reagent solution quality indicator determined by the software algorithm of FIGS. 2A and 2B.
Figure 8B:
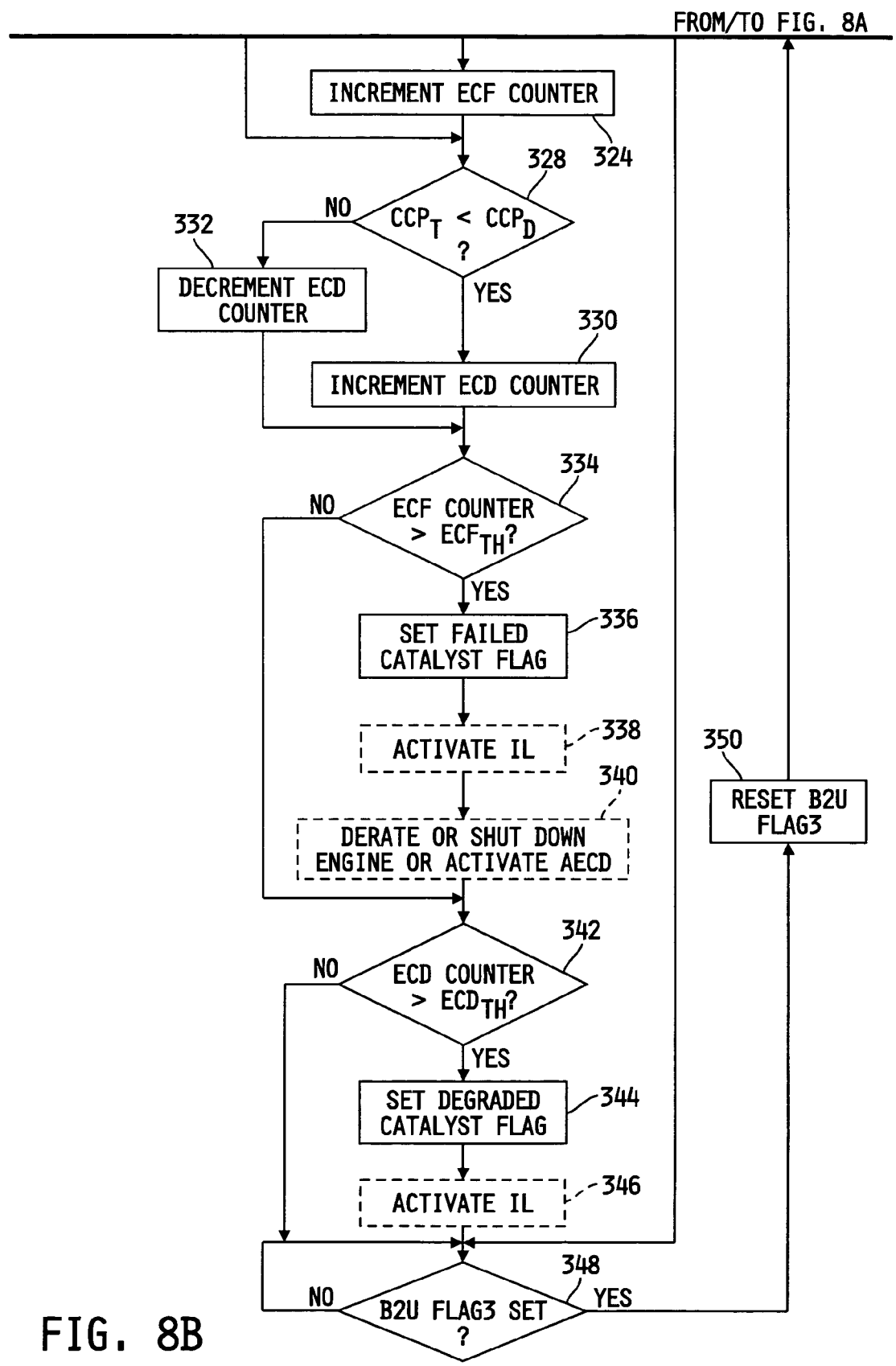

Referring now to FIGS. 8A–8B, a flowchart of one illustrative embodiment of a software algorithm 300 for diagnosing the emissions catalyst 34 based on a comparison of the catalyst capacity point; e.g., the zero-slope point, of normalized NOx flow rate vs. normalized reagent solution flow rate with an expected catalyst capacity point of the emissions catalyst 34 is shown. In the illustrated embodiment, the catalyst capacity points are represented as reagent flow rate values, although it will be understood that the algorithm 300 may alternatively be modified to represent the catalyst capacity points as NOx flow rate values without detracting from the scope of the claims appended hereto. Any such modification to the algorithm 300 would be a mechanical step for a skilled artisan. In any case, the algorithm 300 is stored in memory 55 of the control circuit 50, and is executed by the control circuit 50 as described hereinafter.

The algorithm 300 begins at step 302 where the control circuit 50 is operable to determine whether the B2F flag is set, indicating that the slope data buffer, buffer2, is full. If not, algorithm execution loops back to continually execute step 302. If, at step 302, the control circuit 50 determines that the B2F flag is set, indicating the buffer2 is full, algorithm execution advances to step 304 where the control circuit 50 is operable to set a counter, L, equal to a predefined number, e.g., 1, and another counter, M, equal to a predefined number, e.g., 0. Thereafter at step 306, the control circuit 50 is operable to determine whether the Lth slope value, $slope_L$, in the slope buffer, buffer2, is greater than a slope threshold value, $S_{TH}$ The purpose of step 306 is to determine the catalyst capacity point of the emissions catalyst 34 by determining the knee of the NNFR vs. NRFR data, and in this regard $S_{TH}$ is set sufficiently close to zero to make such a determination. Alternatively, the algorithm 300 may be configured in a known manner to numerically differentiate the slope values in the slope buffer, buffer2, to determine the knee by determining the point having zero slope. Alternatively still, the algorithm 300 may be configured to determine at step 306 the knee of the slope data contained in the slope buffer, buffer2, corresponding to a slope minimum at which the slope value is, or is substantially, zero, in accordance with any known manner. In any case, it is desirable to have a high degree of data resolution in any such global minimum determination technique executed by the control circuit 50 at step 360 to thereby ensure a correspondingly high degree of accuracy in the determination of the catalyst capacity point. In this regard, it is accordingly desirable to sample the operating parameters used to determine NNFR and NRFR at a sufficiently high data sampling rate that will allow the global minimum of the NNFR vs. NRFR data to be determined within a desired degree of accuracy.

It bears pointing out the positive slope portions 196, 196' and 196" of the plots 190, 190' and 190" illustrated in FIG. 7 are a direct result of NOx interference with commercial NOx sensors that are currently available. If such interference is corrected, either via filtering techniques or advances in sensor technology, the plots 190, 190' and 190" would no longer exhibit a "knee" 194, 194', 194" followed by a positive sloped portion 196, 196', 196", but would instead remain at approximately zero slope once the minimum was reached. In such cases, step 306 may be modified to determine the zero slope point using any suitable and conventional minimum detecting strategy.

If, at step 306, the control circuit 50 determines that the Lth slope value is the knee of the slope data contained in the slope data buffer, buffer2, which corresponds to the catalyst capacity point of the emissions catalyst 34, algorithm execution advances to step 308 where the control circuit 50 is operable to determine the corresponding catalyst capacity point, CCP, from the available NNFR and NRFR data. In the illustrated embodiment, the control circuit 50 is operable to execute step 308 by determining the catalyst capacity point, CCP, as the corresponding Lth reagent flow rate value, $RFR_L$, which is a function of the Lth normalized reagent flow rate value, $NNFR_L$ and the maximum reagent flow rate value, MAXR, as described hereinabove. Alternatively, the control circuit 50 may be operable at step 308 to determine the catalyst capacity point, CCP, as the corresponding Lth NOx flow rate value, $NFR_L$, which is a function of $NNFR_L$ and the maximum NOx flow rate value, MAXN, as described hereinabove. Thereafter at step 310, the control circuit 50 is operable to load the catalyst capacity point, CCP, into a catalyst capacity point data buffer, buffer3, and thereafter at step 312 the control circuit 50 is operable to increment the value of "M." In one embodiment, buffer3 is a conventional rolling buffer configured to hold a predefined number of catalyst capacity point data values such that when the buffer is full, the newest catalyst capacity point data entering the buffer pushes out the oldest catalyst capacity point data so that the buffer always holds the most recent predefined number of catalyst capacity point data values. In one illustrative example, buffer3 is sized to hold 10 catalyst capacity point data values, although buffer3 may be alternatively sized to hold any desired number of catalyst capacity point data value; e.g., 5–100 data values. Alternatively, buffer3 may be configured as one or more other conventional data buffers, and algorithm 300 may, in such embodiments, include conventional steps for maintaining a desired number of the most recent catalyst capacity point data values therein.

Algorithm execution advances from step 312, and from the "no" branch of step 306, to step 314 where the control circuit 50 is operable to determine whether "L" is equal to the size, B2S, of the slope data buffer, buffer2. If not, algorithm execution advances to step 316 where the control circuit 50 is operable to increment the value of "L", and then loops back to step 306. If, on the other hand, the control circuit 50 determines that "L" is equal to the size, B2S, of buffer2, algorithm execution advances to step 318 where the control circuit 50 is operable to determine whether the value of "M" is greater than zero. If so, then the catalyst capacity point data buffer, buffer3, holds at least one catalyst capacity point value and algorithm execution advances to step 320 where the control circuit 50 is operable to define a catalyst capacity point test value, $CCP_T$ to a function of the contents of buffer3. For example, the control circuit 50 may be operable at step 320 to set $CCP_T$ to an average of a number, e.g., five, of the lowest valued data entries in buffer3. Other functions of buffer3 will occur to those skilled in the art, and any such other functions are intended to fall within the scope of the appended claims. If, on the other hand, the control circuit 50 determines at step 318 that "M" is not greater than zero, then the catalyst capacity point data buffer, buffer3, is empty and algorithm execution advances to step 348.

From step 320, algorithm execution advances to step 322 where the control circuit 50 is operable to compare the catalyst capacity point test value, $CCP_T$, to an emissions catalyst failure threshold. In the illustrated example, reagent flow rate is used as the catalyst capacity point indicator, and in this example step 322 of the algorithm 300 is accordingly configured to determine whether $CCP_T$ is less than the catalyst capacity failure point, $CCP_F$, illustrated in FIG. 7. If so, this indicates that the catalyst capacity point, corresponding to the knee or minimum of the NNFR vs. NRFR data, is below the catalyst capacity failure point, $CCP_F$, and algorithm execution advances to step 324 where the control circuit 50 is operable to increment the emissions catalyst failure (ECF) counter. If, on the other hand, the control circuit 50 determines at step 322 that the catalyst capacity point test value, $CCP_T$, is not less than the catalyst capacity failure point, $CCP_F$, algorithm execution advances to step 326 where the control circuit 50 is operable to decrement the emissions catalyst failure (ECF) counter. In embodiments where the NOx flow rate is instead used as the catalyst capacity point indicator, $CCP_F$ will correspond to a NOx flow rate value that is greater than the NOx flow rate value of the expected catalyst capacity point, $CCP_E$, and step 322 of the algorithm 300 will accordingly be modified to advance to step 324 only if $CCP_T$ is greater than $CCP_F$ and to otherwise advance to step 326. In any case, algorithm execution advances from steps 324 and 326 to step 328. In either case, the control circuit 50 is operable at steps 322–326 to determine whether the catalyst capacity point test value, $CCP_T$, falls beyond the catalyst capacity failure point, $CCP_F$, to increment the ECF counter if $CCP_T$ falls beyond $CCP_F$ and to otherwise decrement the ECF counter. Although not illustrated in the drawings, the ECF counter will be reset at some appropriate time prior to execution of algorithm 300.

At step 328, the control circuit 50 is operable to compare the catalyst capacity point test value, $CCP_T$, to an emissions catalyst degraded threshold. In the illustrated example, reagent flow rate is used as the catalyst capacity point indicator, and in this example step 326 of the algorithm 300 is accordingly configured to determine whether $CCP_T$ is less than the catalyst capacity degraded point, $CCP_D$, illustrated in FIG. 7. If so, this indicates that the catalyst capacity point, corresponding to the knee or minimum of the NNFR vs. NRFR data, is greater than the catalyst capacity failure point, $CCP_F$, but less than the catalyst capacity degraded point, $CCP_D$, and algorithm execution advances to step 330 where the control circuit 50 is operable to increment the emissions catalyst degraded (ECD) counter. If, on the other hand, the control circuit 50 determines at step 328 that the catalyst capacity point test value, $CCP_T$, is not less than the catalyst capacity degraded point, $CCP_D$, algorithm execution advances to step 332 where the control circuit 50 is operable to decrement the emissions catalyst degraded (ECD) counter. In embodiments where the NOx flow rate is used as the catalyst capacity point indicator, $CCP_D$ will correspond to a NOx flow rate value that is greater than the NOx flow rate value of the expected catalyst capacity point, $CCP_E$, and step 328 of the algorithm 300 will accordingly be modified to advance to step 330 only if $CCP_T$ is greater than $CCP_D$ and to otherwise to advance to step 332. In any case, algorithm execution advances from steps 330 and 332 to step 334. In either case, the control circuit 50 is operable at steps 328–332 to determine whether the catalyst capacity point test value, $CCP_T$, falls beyond the catalyst capacity degraded point, $CCP_D$, but within the catalyst capacity failure point, $CCP_F$, to increment the ECF counter if $CCP_T$ falls within $CCP_F$ but beyond $CCP_D$ and to otherwise decrement the ECD counter. Although not illustrated in the drawings, the ECD counter will be reset at some appropriate time prior to execution of algorithm 300. If $CCP_T$ falls within $CCP_D$, the emissions catalyst 34 is deemed to be operating normally.

At step 334, the control circuit 50 is operable to determine whether the count value of the ECF counter has exceeded a failed emissions catalyst count value, $ECF_{TH}$, wherein $ECF_{TH}$ may be any integer value. If so, algorithm execution advances to step 336 where the control circuit 50 is operable to set a failed emissions catalyst flag, wherein the failed catalyst flag may be either one or both of a flag internal to the control circuit 50 or a flag that is broadcast by the control circuit 50 on a conventional data link as described hereinabove. Additionally, as shown in phantom in FIG. 8B, the algorithm 300 may include step 338 following step 336 where the control circuit 50 is operable to activate an appropriate one or more of the indicator lamps, IL, 80 shown in FIG. 1. Alternatively or additionally, also as shown in phantom in FIG. 8B, the algorithm 300 may include step 340 following step 338 (or following step 336 in embodiments where step 338 is not included) where the control circuit 50 is operable to derate the engine 12 by controlling the one or more fuel signals supplied to the fuel system 72 in a known manner to reduce the performance of the engine 12, or to shut down the engine 12 using any known engine shut down technique, or to activate one or more auxiliary emissions control devices (AECDs) as described hereinabove.

Algorithm execution advances from step 340 (or from step 338 if step 340 is not included, or from step 336 if neither of steps 338 or 340 are included) and from the "no" branch of step 334 to step 342 where the control circuit 50 is operable to determine whether the count value of the ECD counter has exceeded a degraded emissions catalyst count value, $ECD_{TH}$, wherein $ECD_{TH}$ may be any integer value. If so, algorithm execution advances to step 344 where the control circuit 50 is operable to set a degraded emissions catalyst flag, wherein the degraded catalyst flag may be either one or both of a flag internal to the control circuit 50 or a flag that is broadcast by the control circuit 50 on a conventional data link as described hereinabove. Additionally, as shown in phantom in FIG. 8B, the algorithm 300 may include step 346 following step 344 where the control circuit 50 is operable to activate an appropriate one or more of the indicator lamps, IL, 80 shown in FIG. 1.

Algorithm execution advances from step 346 (or from step 344 if step 346 is not included) and from the "no" branch of step 342 to step 348 where the control circuit 50 is operable to determine whether buffer2 has been updated with new slope information by monitoring the status of the B2U Flag3. If the B2U Flag3 is not set, algorithm execution loops back to continually execute step 348 until the control circuit 50 determines that the B2U Flag3 has been set by the algorithm 150 of FIGS. 2A–2B. When the control circuit 50 determines at step 348 that the B2U Flag3 has been set, algorithm execution advances to step 350 where the control circuit 50 is operable to reset the B2U Flag3, and then loops back to step 304.

The control circuit 50 is operable, under the direction of the algorithm 300 of FIGS. 8A–8B, to process the slope values in the slope data buffer, buffer2, to determine whether the slope data in buffer2 includes a catalyst capacity point corresponding to a global minimum or knee of the NNFR vs. NRFR data. If so, a corresponding catalyst capacity point indicator is stored in a catalyst capacity point data buffer. The control circuit 50 is operable to execute the algorithm 300 each time that the slope data buffer, buffer2, is updated with new slope information, so that the catalyst capacity point data buffer, buffer3, may include therein one or more catalyst capacity point values up to the size, B3S, of buffer3. After each time that the catalyst capacity point data buffer, buffer3, is updated, the control circuit 50 is operable to process the catalyst capacity point values contained in buffer3, and to increment an emissions catalyst failure (ECF) counter for each catalyst capacity point that is beyond a catalyst capacity failure point, $CCP_F$, and to increment an emissions catalyst degraded (ECD) counter for each catalyst capacity point that is within a catalyst capacity failure point, $CCP_F$, but beyond a catalyst capacity degraded point, $CCP_D$. An emissions catalyst failure flag is set if the ECF counter exceeds a predefined ECF count value, which may be any integer value, and an emissions catalyst degraded flag is set if the ECD counter exceeds a predefined ECD count value, which may be any integer value.

Figure 9A:
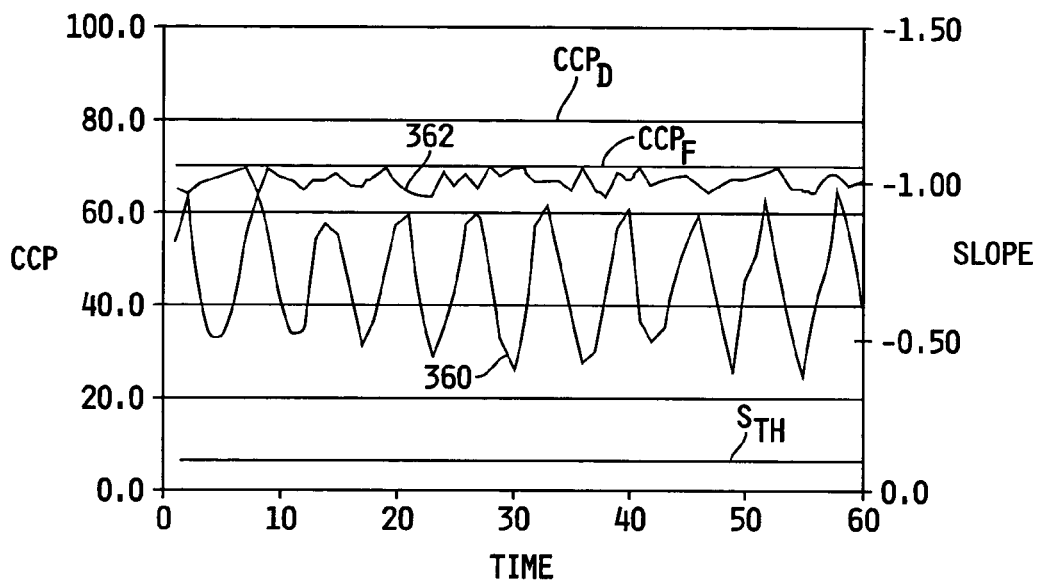
FIG. 9A is a plot of reagent solution flow rate and corresponding reagent solution quality indicator and over time illustrating determination by the software algorithm of FIGS. 8A and 8B of an acceptable emissions catalyst operating within normal catalyst capacity.
Figure 9B:
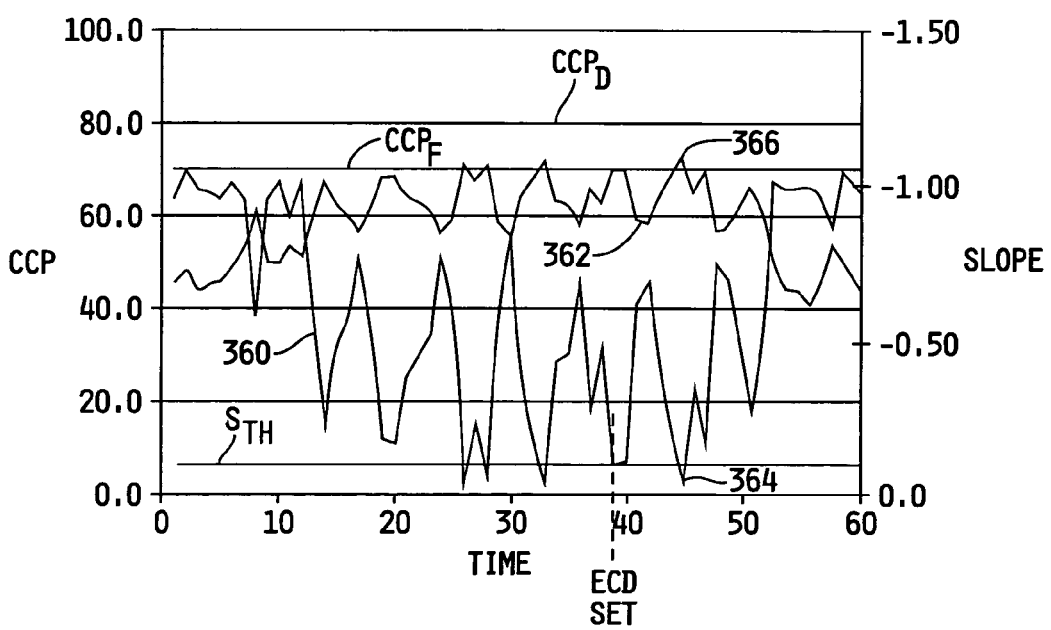
FIG. 9B is a plot of reagent solution flow rate and corresponding reagent solution quality indicator over time illustrating determination by the software algorithm of FIGS. 8A and 8B of a degraded emissions catalyst operating within normal catalyst capacity.

Such operation is graphically illustrated in FIGS. 9A–9D. Referring to FIG. 9A, for example, a plot of slope data 360 (contents of buffer2) vs. time and catalyst capacity point data 362 (contents of buffer3) vs. time is shown illustrating processing by the algorithm 300 of the slope data contained in the slope buffer, buffer2, for a normally operating emissions catalyst 34 operating in the region 192 of the plot 190 of FIG. 7. Plots 360 and 362 of FIG. 9A illustrate that none of the slope data points 360 cross the catalyst capacity point threshold value, $S_{TH}$, and in this example the emissions catalyst 34 is accordingly deemed to be operating normally. Referring to FIG. 9B, another plot 360 of slope data 360 (contents of buffer2) vs. time and catalyst capacity point data 362 (contents of buffer3) vs. time is shown illustrating processing by the algorithm 300 of the slope data contained in the slope buffer, buffer2, for a normally operating emissions catalyst 34 operating at and around the knee, e.g., 194' of the plot 190' of FIG. 7. Plots 360 and 362 illustrate that for each slope data point 364 in buffer2 that crosses the catalyst capacity point threshold, $S_{TH}$, the corresponding catalyst capacity point data value 366 falls below $CCP_D$ but above $CCP_F$. In this case, if a sufficient number of such occurrences exist the control circuit 50 will set the emissions catalyst degraded flag. In the example illustrated in FIG. 9B, for example, the control circuit 50 is operable to set the emissions catalyst degraded flag (ECD SET), and in some embodiments to further activate an appropriate one or more of the indicator lamps, at the fourth occurrence of a slope data value 364 crossing the slope threshold, $S_{TH}$, with the corresponding catalyst capacity point value 366 falling between $CCP_D$ and $CCP_F$.

Figure 9C:
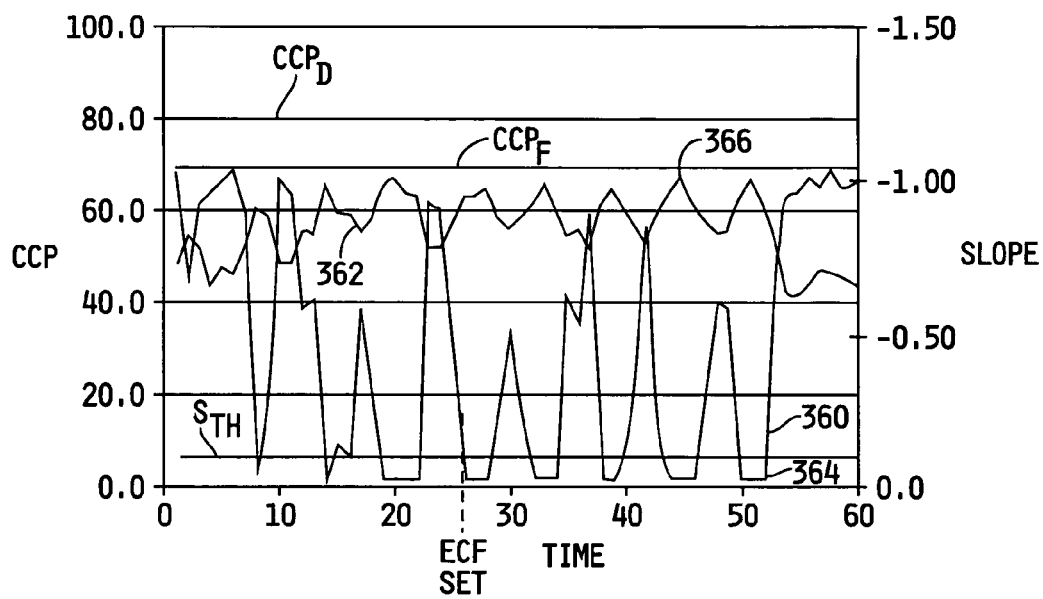
FIG. 9C is a plot of reagent solution flow rate and corresponding reagent solution quality indicator over time illustrating determination by the software algorithm of FIGS. 8A and 8B of a failed emissions catalyst operating within normal catalyst capacity.

Referring to FIG. 9C, another plot 360 of slope data 360 (contents of buffer2) vs. time and catalyst capacity point data 362 (contents of buffer3) vs. time is shown illustrating processing by the algorithm 300 of the slope data contained in the slope buffer, buffer2, for a normally operating emissions catalyst 34 operating at and around the knee, e.g., 194", of the plot 190" of FIG. 7. Plots 360 and 362 illustrate that for each slope data point 364 in buffer2 that crosses the catalyst capacity point threshold, $S_{TH}$, the corresponding catalyst capacity point data value 366 falls below both $CCP_D$ and $CCP_F$. In this case, if a sufficient number of such occurrences exist the control circuit 50 will set the emissions catalyst failed flag. In the example illustrated in FIG. 9C, for example, the control circuit 50 is operable to set the emissions catalyst failure flag (ECF SET), and in some embodiments to further activate an appropriate one or more of the indicator lamps and/or to derate the engine 12, at the fifth occurrence of a slope data value 364 crossing the slope threshold, $S_{TH}$, with the corresponding catalyst capacity point value 366 falling below $CCP_F$.

Figure 9D:
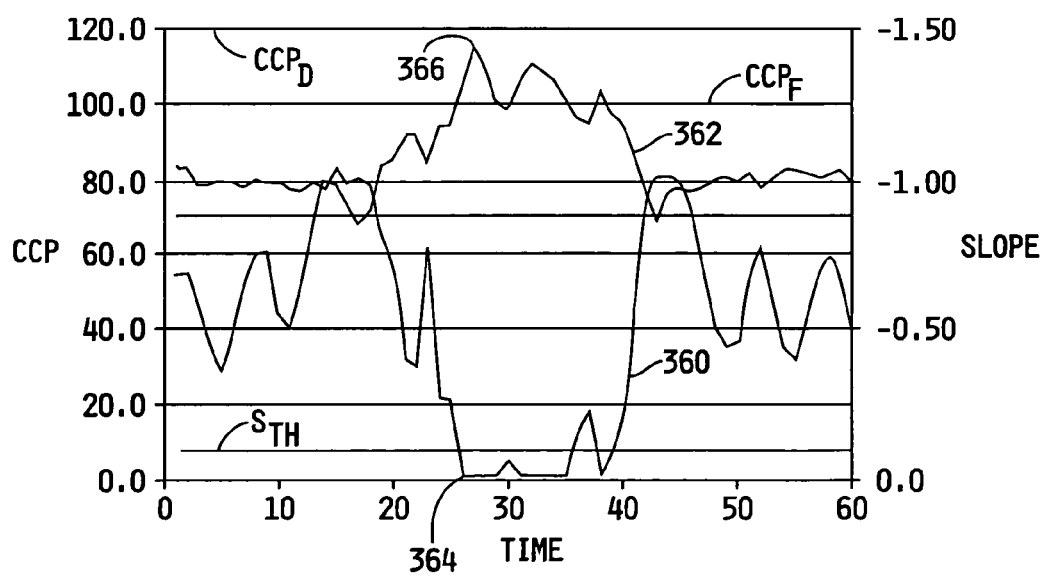
FIG. 9D is a plot of reagent solution flow rate and corresponding reagent solution quality indicator over time illustrating determination by the software algorithm of FIGS. 8A and 8B of an acceptable emissions catalyst operating beyond catalyst capacity.

Referring to FIG. 9D, another plot 360 of slope data 360 (contents of buffer2) vs. time and catalyst capacity point data 362 (contents of buffer3) vs. time is shown illustrating processing by the algorithm 300 of the slope data contained in the slope buffer, buffer2, for a normally operating emissions catalyst 34 operating at and around the knee, e.g., 194 of the plot 190 of FIG. 7. Plots 360 and 362 illustrate that for each slope data point 364 in buffer2 that crosses the catalyst capacity point threshold, $S_{TH}$, the corresponding catalyst capacity point data value 366 is above both $CCP_D$ and $CCP_F$. In this example, the emissions catalyst 34 is accordingly deemed to be operating normally.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while the invention has been described in the context of in an internal combustion engine application, it will be understood that the concepts described herein relating to diagnosing reagent solution quality and/or diagnosing emissions catalyst degradation are applicable to systems for processing gas supplied by sources other than an internal combustion engine. As one specific example, a NOx-scavenging system may be located in an area where the ambient air may contain reducible amounts of NOx, such as a metropolitan downtown area, wherein such a system is configured to reduce NOx directly out of ambient air using a selective catalytic reduction system of the type described herein. In such an application, exhaust conduit 30 or 32 may be configured to simply pull the NOx-containing gas, in the form of ambient air, directly into and through the emissions catalyst 34, where the reagent solution from the reagent source would be dosed into the catalyst 34 in a conventional manner to reduce the NOx concentration of the gas. The techniques described herein for diagnosing reagent solution quality and/or diagnosing emissions catalyst degradation are directly applicable to such a system, wherein the NOx-containing gas supplied to the emissions catalyst 34 is ambient air, and wherein determination of NOx flow rate upstream of the emissions catalyst 34 would require an upstream NOx sensor, and knowledge of gas (ambient air) flow rate obtained through conventional techniques. This and other applications of the concepts described herein are intended to fall within the scope of the appended claims.

What is claimed is:

1. A system for determining a reagent solution quality indicator, comprising:
   a reagent solution source for supplying the reagent solution to an emissions catalyst configured to receive a NOx-containing gas therethrough,
   means for determining a NOx flow rate corresponding to a flow rate of NOx reduced from the gas by the emissions catalyst,
   means for determining a reagent solution flow rate corresponding to a flow rate of the reagent solution into the emissions catalyst, and
   a control circuit determining the reagent solution quality indicator as a function of the NOx flow rate and the reagent solution flow rate.

2. The system of claim 1 wherein the means for determining a NOx flow rate includes:
   means for determining a flow rate of NOx entering the emissions catalyst, and
   means for determining a flow rate of NOx exiting the emissions catalyst,
   wherein the control circuit is configured to determine a difference between the flow rate of NOx entering the emissions catalyst and the flow rate of NOx exiting the emissions catalyst, and to determine a normalized NOx flow rate as the difference normalized to a maximum NOx flow rate value.

3. The system of claim 2 wherein the control circuit is configured to determine a normalized reagent solution flow rate as the reagent solution flow rate value normalized to a maximum reagent solution flow rate value.

4. The system of claim 3 wherein the control circuit is configured to determine the reagent solution quality indicator as a slope of the normalized NOx flow rate and the normalized reagent solution flow rate over time.

5. The system of claim 1 further including an internal combustion having an exhaust manifold producing the NOx-containing gas in the form of engine exhaust gas,
   and wherein the emissions catalyst is coupled to the exhaust manifold such that the engine exhaust gas flows therethrough.

6. A method of determining a reagent solution quality indicator, comprising:
   determining a NOx flow rate corresponding to a flow rate of NOx reduced from a NOx-containing gas passing through an emissions catalyst,
   determining a reagent solution flow rate corresponding to a flow rate of the reagent solution into the emissions catalyst, and
   determining the reagent solution quality indicator as a function of the NOx flow rate and the reagent solution flow rate.

7. The method of claim 6 wherein the act of determining a NOx flow rate includes:
   determining a flow rate of NOx entering the emissions catalyst,
   determining a flow rate of NOx exiting the emissions catalyst,
   computing a difference between the flow rate of NOx entering the emissions catalyst and the flow rate of NOx exiting the emissions catalyst, and
   determining the NOx flow rate as the difference normalized to a maximum NOx flow rate value.

8. The method of claim 7 wherein the act of determining a reagent solution flow rate includes normalizing the reagent solution flow rate to a maximum reagent flow rate value.

9. The method of claim 8 wherein the act of determining the reagent solution quality indicator includes determining a slope of normalized values of the NOx flow rate and the reagent solution flow rate over time.

10. A system for diagnosing reagent solution quality, comprising:
    a reagent solution source for supplying the reagent solution to an emissions catalyst configured to receive a NOx-containing gas therethrough,
    means for determining a reagent solution quality indicator as a function of a flow rate of NOx reduced from the gas by the emissions catalyst and a flow rate of the reagent solution into the emissions catalyst, and
    a control circuit monitoring the reagent solution quality indicator and producing a fault value if the reagent solution quality indicator crosses a reagent quality indicator threshold.

11. The system of claim 10 wherein the control circuit is configured to produce the fault value only if the reagent solution quality indicator has extended beyond the reagent solution quality indicator value for a predefined time period.

12. The system of claim 10 further including an indicator lamp,
and wherein the control circuit is configured to activate the indicator lamp if the reagent solution quality indicator crosses the reagent quality indicator threshold.

13. The system of claim 12 wherein the control circuit is configured to activate the indicator lamp only if the reagent solution quality indicator has extended beyond the reagent solution quality indicator value for a predefined time period.

14. The system of claim 13 wherein the control circuit is configured to command activation of the auxiliary emissions control device only if the reagent solution quality indicator has extended beyond the reagent solution quality indicator value for a predefined time period.

15. The system of claim 10 further including an internal combustion having an exhaust manifold producing the NOx-containing gas in the form of engine exhaust gas,
and wherein the emissions catalyst is coupled to the exhaust manifold such that the engine exhaust gas flows therethrough.

16. The system of claim 15 wherein the control circuit is configured to command a derate of the engine if the reagent solution quality indicator crosses the reagent quality indicator threshold.

17. The system of claim 16 wherein the control circuit is configured to command a derate of the engine only if the reagent solution quality indicator has extended beyond the reagent solution quality indicator value for a predefined time period.

18. The system of claim 15 wherein the control circuit is configured to command a shut down of the engine if the reagent solution quality indicator crosses the reagent quality indicator threshold.

19. The system of claim 18 wherein the control circuit is configured to command a shut down of the engine only if the reagent solution quality indicator has extended beyond the reagent solution quality indicator value for a predefined time period.

20. The system of claim 15 wherein the control circuit is configured to command activation of an auxiliary emissions control device if the reagent solution quality indicator crosses the reagent quality indicator threshold.

21. The system of claim 10 wherein the reagent solution quality indicator threshold is a poor reagent solution quality threshold and the fault value is a poor reagent solution quality flag,
and wherein the control circuit is configured to set the poor reagent solution quality flag if the reagent solution quality indicator crosses the poor reagent solution quality threshold.

22. The system of claim 21 wherein the control circuit is configured to set the poor reagent solution quality flag only if the reagent solution quality indicator extends beyond the poor reagent solution quality threshold for a predefined time period.

23. The system of claim 10 wherein the reagent solution quality indicator threshold is a failed reagent solution quality threshold and the fault value is a failed reagent solution quality flag,
and wherein the control circuit is configured to set the failed reagent solution quality flag if the reagent solution quality indicator crosses the failed reagent solution quality threshold.

24. The system of claim 23 wherein the control circuit is configured to set the failed reagent solution quality flag only if the reagent solution quality indicator extends beyond the failed reagent solution quality threshold for a predefined time period.

25. The system of claim 10 wherein the reagent solution quality indicator threshold is a high reagent solution quality threshold and the fault value is a high reagent solution quality flag,
and wherein the control circuit is configured to set the high reagent solution quality flag if the reagent solution quality indicator crosses the high reagent solution quality threshold.

26. The system of claim 25 wherein the control circuit is configured to set the high reagent solution quality flag only if the reagent solution quality indicator extends beyond the high reagent solution quality threshold for a predefined time period.

27. The system of claim 10 wherein the control circuit is configured to produce a reagent solution change value if the reagent solution quality indicator changes by more than a change threshold.

28. The system of claim 27 wherein the control circuit is configured to produce the reagent solution change value only if the reagent solution quality indicator changes by more than the change threshold for a predefined time period.

29. A method of diagnosing reagent solution quality, comprising:
determining a reagent solution quality indicator as a function of a flow rate of NOx reduced from a NOx-containing gas passing through an emissions catalyst and a flow rate of the reagent solution into the emissions catalyst, and
monitoring the reagent solution quality indicator, and
producing a fault value if the reagent solution quality indicator crosses a reagent quality indicator threshold.

30. The method of claim 29 wherein the act of producing a fault value includes producing the fault value only if the reagent solution quality indicator extends beyond the reagent quality indicator threshold for a predefined time period.

31. The method of claim 29 further including activating an indicator lamp if the reagent quality indicator crosses the reagent quality indicator threshold.

32. The method of claim 31 wherein the act of activating an indicator lamp includes activating the indicator lamp only if the reagent solution quality indicator extends beyond the reagent quality indicator threshold for a predefined time period.

33. The method of claim 29 further including an internal combustion engine having an exhaust manifold producing the NOx-containing gas in the form of engine exhaust, the emissions catalyst coupled to the exhaust manifold so that the engine exhaust flows therethrough,
and wherein the method further includes derating the engine if the reagent quality indicator crosses the reagent quality indicator threshold.

34. The method of claim 33 wherein the act of derating the engine includes derating the engine only if the reagent solution quality indicator extends beyond the reagent quality indicator threshold for a predefined time period.

35. The method of claim 29 further including an internal combustion engine having an exhaust manifold producing the NOx-containing gas in the form of engine exhaust, the emissions catalyst coupled to the exhaust manifold so that the engine exhaust flows therethrough,
and wherein the method further includes shutting down the engine if the reagent quality indicator crosses the reagent quality indicator threshold.

36. The method of claim 35 wherein the act of shutting down the engine includes shutting down the engine only if the reagent solution quality indicator extends beyond the reagent quality indicator threshold for a predefined time period.

37. The method of claim 29 further including an internal combustion engine having an exhaust manifold producing the NOx-containing gas in the form of engine exhaust, the emissions catalyst coupled to the exhaust manifold so that the engine exhaust flows therethrough,
and wherein the method further includes activating an auxiliary emissions control device if the reagent quality indicator crosses the reagent quality indicator threshold.

38. The method of claim 37 wherein the act of activating an auxiliary emissions control device includes activating the auxiliary emissions control device only if the reagent solution quality indicator extends beyond the reagent quality indicator threshold for a predefined time period.

39. The method of claim 29 wherein the reagent solution quality indicator threshold is a poor reagent solution quality threshold and the fault value is a poor reagent solution quality flag,
and wherein the act of producing a fault value includes setting the poor reagent solution quality flag if the reagent solution quality indicator crosses the poor reagent solution quality threshold.

40. The method of claim 39 wherein the act of setting the poor reagent solution quality flag includes setting the poor reagent solution quality flag only if the reagent solution quality indicator extends beyond the poor reagent solution quality threshold for a predefined time period.

41. The method of claim 29 wherein the reagent solution quality indicator threshold is a failed reagent solution quality threshold and the fault value is a failed reagent solution quality flag,
and wherein the act of producing a fault value includes setting the failed reagent solution quality flag if the reagent solution quality indicator crosses the failed reagent solution quality threshold.

42. The method of claim 41 wherein the act of setting the failed reagent solution quality flag includes setting the failed reagent solution quality flag only if the reagent solution quality indicator extends beyond the failed reagent solution quality threshold for a predefined time period.

43. The method of claim 29 wherein the reagent solution quality indicator threshold is a high reagent solution quality threshold and the fault value is a high reagent solution quality flag,
and wherein the act of producing a fault value includes setting the high reagent solution quality flag if the reagent solution quality indicator crosses the high reagent solution quality threshold.

44. The method of claim 43 wherein the act of setting the high reagent solution quality flag includes setting the high reagent solution quality flag only if the reagent solution quality indicator extends beyond the high reagent solution quality threshold for a predefined time period.

45. The method of claim 29 further including producing a reagent solution change value if the reagent solution quality indicator changes by more than a change threshold.

46. The method of claim 45 wherein the act of producing a reagent solution change value includes producing the reagent solution change value only if the reagent solution quality indicator changes by more than the change threshold for a predefined time period.

47. A system for diagnosing an emissions catalyst having a NOx-containing gas passing therethrough, comprising:
a reagent solution source for supplying the reagent solution to the emissions catalyst,
means for determining a reagent solution flow rate corresponding to a flow rate of the reagent solution into the emissions catalyst,
means for determining a NOx flow rate corresponding to a flow rate of NOx reduced from the gas by the emissions catalyst, and
a control circuit determining a catalyst capacity point, beyond which a reaction capacity of the emissions catalyst is exceeded, as a function of the NOx flow rate and the reagent solution flow rate, the control circuit producing a fault value if the catalyst capacity point falls beyond a predefined catalyst capacity threshold.

48. The system of claim 47 wherein the control circuit is configured to monitor the catalyst capacity point and produce the fault value only if the catalyst capacity point falls beyond the predefined catalyst capacity threshold a sufficient number of times over a predefined time period.

49. The system of claim 47 further including an indicator lamp,
and wherein the control circuit is configured to activate the indicator lamp if the catalyst capacity point falls beyond the predefined catalyst capacity threshold.

50. The system of claim 47 further including an internal combustion engine having an exhaust manifold producing the NOx-containing gas in the form of engine exhaust gas,
and wherein the emissions catalyst is coupled to the exhaust manifold such that the engine exhaust gas flows therethrough.

51. The system of claim 50 wherein the control circuit is configured to command a derate of the engine if the catalyst capacity point falls beyond the predefined catalyst capacity threshold.

52. The system of claim 50 wherein the control circuit is configured to command a shut down of the engine if the catalyst capacity point falls beyond the predefined catalyst capacity threshold.

53. The system of claim 50 wherein the control circuit is configured to command activation of an auxiliary emissions control device if the catalyst capacity point falls beyond the predefined catalyst capacity threshold.

54. The system of claim 47 wherein the predefined catalyst capacity threshold is a catalyst capacity failure threshold and the fault value is an emissions catalyst failure flag,
and wherein the control circuit is configured to set the emissions catalyst failure flag if the catalyst capacity point falls beyond the catalyst capacity failure threshold.

55. The system of claim 54 wherein the control circuit is further configured to set an emissions catalyst degraded flag if the catalyst capacity point falls within the catalyst capacity failure threshold but beyond a catalyst capacity degraded threshold.

56. The system of claim 47 wherein the predefined catalyst capacity threshold is a catalyst capacity degraded threshold and the fault value is an emissions catalyst degraded flag,
and wherein the control circuit is configured to set the emissions catalyst degraded flag if the catalyst capacity point falls beyond the catalyst capacity degraded threshold.

57. The system of claim 47 wherein the catalyst capacity point corresponds to the reagent solution flow rate at which the catalyst capacity point occurs, and wherein the predefined catalyst capacity threshold is a predefined reagent solution flow rate threshold.

58. The system of claim 47 wherein the catalyst capacity point corresponds to the NOx flow rate at which the catalyst capacity point occurs, and wherein the predefined catalyst capacity threshold is a predefined NOx flow rate threshold.

59. A method of diagnosing an emissions catalyst having a NOx-containing gas passing therethrough, comprising:
  determining a NOx flow rate corresponding to a flow rate of NOx reduced from the gas by the emissions catalyst,
  determining a reagent solution flow rate corresponding to a flow rate of reagent solution into the emissions catalyst,
  determining a catalyst capacity point, beyond which a reaction capacity of the emissions catalyst is exceeded, as a function of the NOx flow rate and the reagent solution flow rate, and
  producing a fault value if the catalyst capacity point falls beyond a predefined catalyst capacity threshold.

60. The method of claim 59 wherein the act of producing the fault value includes producing the fault value only if the catalyst capacity point falls beyond the predefined catalyst capacity threshold a sufficient number of times over a predefined time period.

61. The method of claim 59 further including activating an indicator lamp if the catalyst capacity point falls beyond a predefined catalyst capacity threshold.

62. The method of claim 59 further including an internal combustion engine having an exhaust manifold producing the NOx-containing gas in the form of engine exhaust, the emissions catalyst coupled to the exhaust manifold so that the engine exhaust flows therethrough,
  and wherein the method further includes derating the engine if the catalyst capacity point falls beyond a predefined catalyst capacity threshold.

63. The method of claim 59 further including an internal combustion engine having an exhaust manifold producing the NOx-containing gas in the form of engine exhaust, the emissions catalyst coupled to the exhaust manifold so that the engine exhaust flows therethrough,
  and wherein the method further includes shutting down the engine if the catalyst capacity point falls beyond a predefined catalyst capacity threshold.

64. The method of claim 59 further including an internal combustion engine having an exhaust manifold producing the NOx-containing gas in the form of engine exhaust, the emissions catalyst coupled to the exhaust manifold so that the engine exhaust flows therethrough,
  and wherein the method further includes activating an auxiliary emissions control device if the catalyst capacity point falls beyond a predefined catalyst capacity threshold.

65. The method of claim 59 wherein the predefined catalyst capacity threshold is a catalyst capacity failure threshold and the fault value is an emissions catalyst failure flag,
  and wherein the act of producing a fault value includes setting the emissions catalyst failure flag if the catalyst capacity point falls beyond the catalyst capacity failure threshold.

66. The method of claim 65 further including setting an emissions catalyst degraded flag if the catalyst capacity point falls within the catalyst capacity failure threshold but beyond a catalyst capacity degraded threshold.

67. The method of claim 59 wherein the predefined catalyst capacity threshold is a catalyst capacity degraded threshold and the fault value is an emissions catalyst degraded flag,
  and wherein the act of producing a fault value includes setting the emissions catalyst degraded flag if the catalyst capacity point falls beyond the catalyst capacity degraded threshold.

68. The method of claim 67 wherein the catalyst capacity point corresponds to the reagent solution flow rate at which the catalyst capacity point occurs, and wherein the predefined catalyst capacity threshold is a predefined reagent solution flow rate threshold.

69. The method of claim 59 wherein the catalyst capacity point corresponds to the NOx flow rate at which the catalyst capacity point occurs, and wherein the predefined catalyst capacity threshold is a predefined NOx flow rate threshold.

* * * * *

UNITED STATES PATENT AND TRADEMARK OFFICE
CERTIFICATE OF CORRECTION

PATENT NO. : 7,067,319 B2 Page 1 of 1
APPLICATION NO. : 10/876066
DATED : June 27, 2006
INVENTOR(S) : Wills et al.

It is certified that error appears in the above-identified patent and that said Letters Patent is hereby corrected as shown below:

Column 16, line 31 "slopek" should be changed to --$slope_K$--.

Column 16, line 34 "slopeK" should be changed to --$slope_K$--.

Column 16, line 54 "slopeK" should be changed to --$slope_K$--.

Column 16, line 58 "slopeK" should be changed to --$slope_K$--.

Column 31, line 23 "14" should be changed to --15--.

Signed and Sealed this

Fifth Day of June, 2007

JON W. DUDAS
*Director of the United States Patent and Trademark Office*